United States Patent
Horii

(10) Patent No.: US 11,408,148 B2
(45) Date of Patent: Aug. 9, 2022

(54) WORKING MACHINE WITH CONTROL DEVICE TO CONTROL OPERATION ALLOWABLE STATE AND OPERATION RESTRICTION STATE

(71) Applicant: KUBOTA CORPORATION, Osaka (JP)

(72) Inventor: Hiroshi Horii, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 114 days.

(21) Appl. No.: 16/448,684

(22) Filed: Jun. 21, 2019

(65) Prior Publication Data
US 2019/0309500 A1 Oct. 10, 2019

Related U.S. Application Data

(63) Continuation of application No. PCT/JP2017/045784, filed on Dec. 20, 2017.

(30) Foreign Application Priority Data

Dec. 22, 2016 (JP) .............................. JP2016-250142

(51) Int. Cl.
*E02F 9/26* (2006.01)
*B60R 1/00* (2022.01)
(Continued)

(52) U.S. Cl.
CPC ................. *E02F 9/26* (2013.01); *B60R 1/00* (2013.01); *E02F 3/43* (2013.01); *E02F 9/2004* (2013.01);
(Continued)

(58) Field of Classification Search
CPC ......... E02F 9/26; E02F 9/2004; E02F 9/2033; E02F 9/24; E02F 9/20; B60R 1/00; B60R 2300/207
See application file for complete search history.

(56) References Cited

U.S. PATENT DOCUMENTS 10,527,731 B2 * 1/2020 Kinoshita ............. E02F 9/2033
2011/0264338 A1 * 10/2011 Park .......................... E02F 9/24
701/50
(Continued)

FOREIGN PATENT DOCUMENTS

CN 103209866 A 7/2013
CN 106029994 A 10/2016
(Continued)

OTHER PUBLICATIONS

Translation of JP-H0810255, Mar. 29, 1996 (Year: 1996).*
(Continued)

*Primary Examiner* — James M Mcpherson
*Assistant Examiner* — Kyle J Kingsland
(74) *Attorney, Agent, or Firm* — Birch, Stewart, Kolasch & Birch, LLP

(57) ABSTRACT

A working machine includes an operation device to conduct operations of the working machine, a control device to control the working machine between an operation allowable state and an operation restriction state, the operation allowable state allowing the working machine to be operated, the operation restriction state restricting the operations conducted by the operation device in comparison with the operation allowable state. The working machine includes a display device having a display portion and an input operation portion. The control device performs control under the operation restriction state when a predetermined input operation is conducted through the input operation portion.

4 Claims, 13 Drawing Sheets

(51) Int. Cl.
  *E02F 9/20* (2006.01)
  *E02F 9/24* (2006.01)
  *E02F 3/43* (2006.01)
  *E02F 3/32* (2006.01)
(52) U.S. Cl.
  CPC .............. *E02F 9/2033* (2013.01); *E02F 9/24* (2013.01); *B60R 2300/207* (2013.01); *E02F 3/32* (2013.01); *E02F 3/435* (2013.01)

(56) References Cited

U.S. PATENT DOCUMENTS

2013/0167227 A1  6/2013  Miura et al.
2015/0373545 A1  12/2015 Miura et al.

FOREIGN PATENT DOCUMENTS

| EP | 2 876 220 A1 | 5/2015 |
|---|---|---|
| JP | 8-10255 Y2 | 3/1996 |
| JP | 9-209418 A | 8/1997 |
| JP | 2002-70084 A | 3/2002 |
| JP | 2005-112022 A | 4/2005 |
| JP | 2008-248613 A | 10/2008 |
| JP | 2013-23982 A | 2/2013 |
| JP | 2013-147886 A | 8/2013 |
| JP | 2015-202841 A | 11/2015 |
| JP | 2016-78652 A | 5/2016 |
| WO | WO 2009/145681 A1 | 12/2009 |
| WO | WO 2016/148309 A1 | 9/2016 |

OTHER PUBLICATIONS

Translation of Yamaguchi et al. (Patent No. WO-2016148309), Sep. 22, 2016 (Year: 2016).*
Translation of Nasu et al. (Patent No. JP-2005112022), Apr. 28, 2005 (Year: 2005).*
Translation of Kudo et al. (Patent No. JP-2016078652), May 16, 2016 (Year: 2016).*

* cited by examiner

WORKING MACHINE WITH CONTROL DEVICE TO CONTROL OPERATION ALLOWABLE STATE AND OPERATION RESTRICTION STATE

CROSS-REFERENCE TO RELATED APPLICATIONS

The present application is a continuation application of International Application No. PCT/JP2017/045784, filed Dec. 20, 2017, which claims priority to Japanese Patent Application No. 2016/250142, filed Dec. 22, 2016. The contents of these applications are incorporated herein by reference in their entirety.

FIELD OF THE INVENTION

The present invention relates to a working machine such as a backhoe, for example.

DISCUSSION OF THE BACKGROUND

The working machine disclosed in Japanese Unexamined Patent Application Publication No. 2013-023982 is previously known.

The working machine disclosed in Japanese Unexamined Patent Application Publication No. 2013-023982 can provide the setting to the working machine through an inputting operation on the display device.

SUMMARY OF THE INVENTION

A working machine according to one aspect of the present invention includes an operation device to conduct operations of the working machine, a control device to control the working machine between an operation allowable state and an operation restriction state, the operation allowable state allowing the working machine to be operated, the operation restriction state restricting the operations conducted by the operation device in comparison with the operation allowable state. The working machine includes a display device having a display portion and an input operation portion. The control device performs control under the operation restriction state when a predetermined input operation is conducted through the input operation portion.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
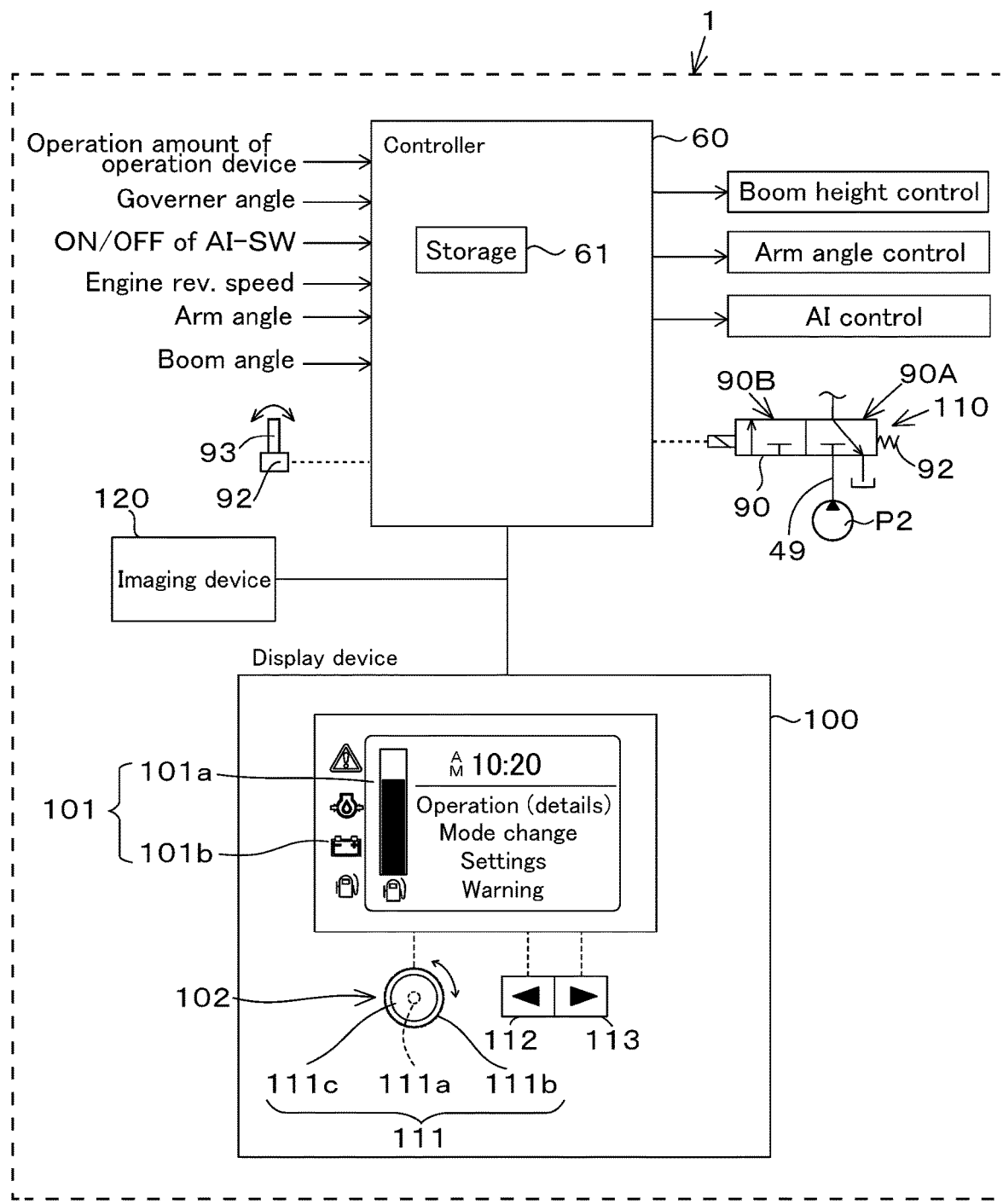
FIG. 1 is a schematic view illustrating a control block of a working machine according to a first embodiment of the present invention.

The embodiments will now be described with reference to the accompanying drawings, wherein like reference numerals designate corresponding or identical elements throughout the various drawings. The drawings are to be viewed in an orientation in which the reference numerals are viewed correctly.

Hereinafter, an embodiment of the present invention will be described with reference to the drawings as appropriate.

First Embodiment

Figure 11:
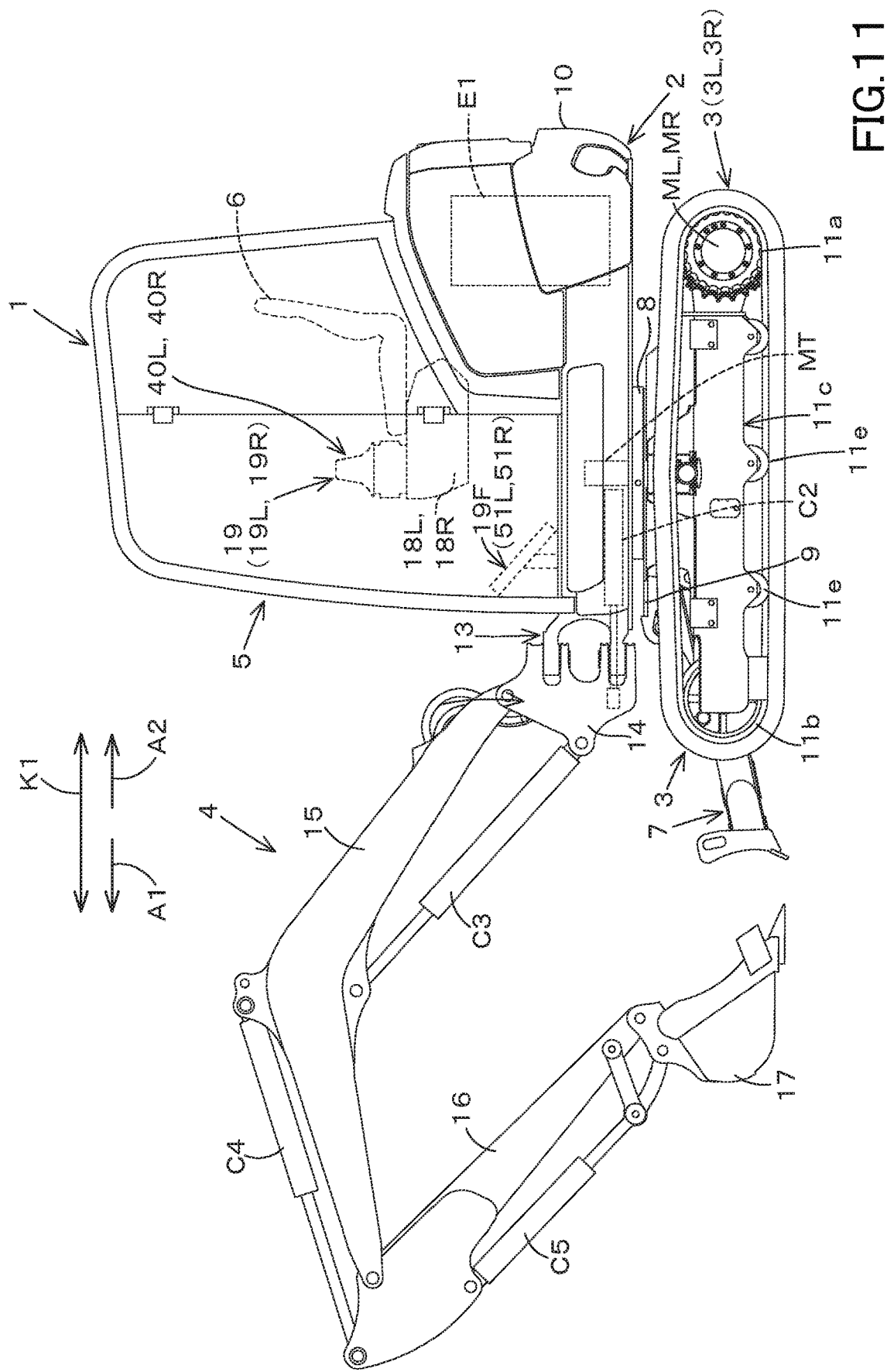
FIG. 11 is a schematic side view illustrating the working machine according to the embodiments.
Figure 12:
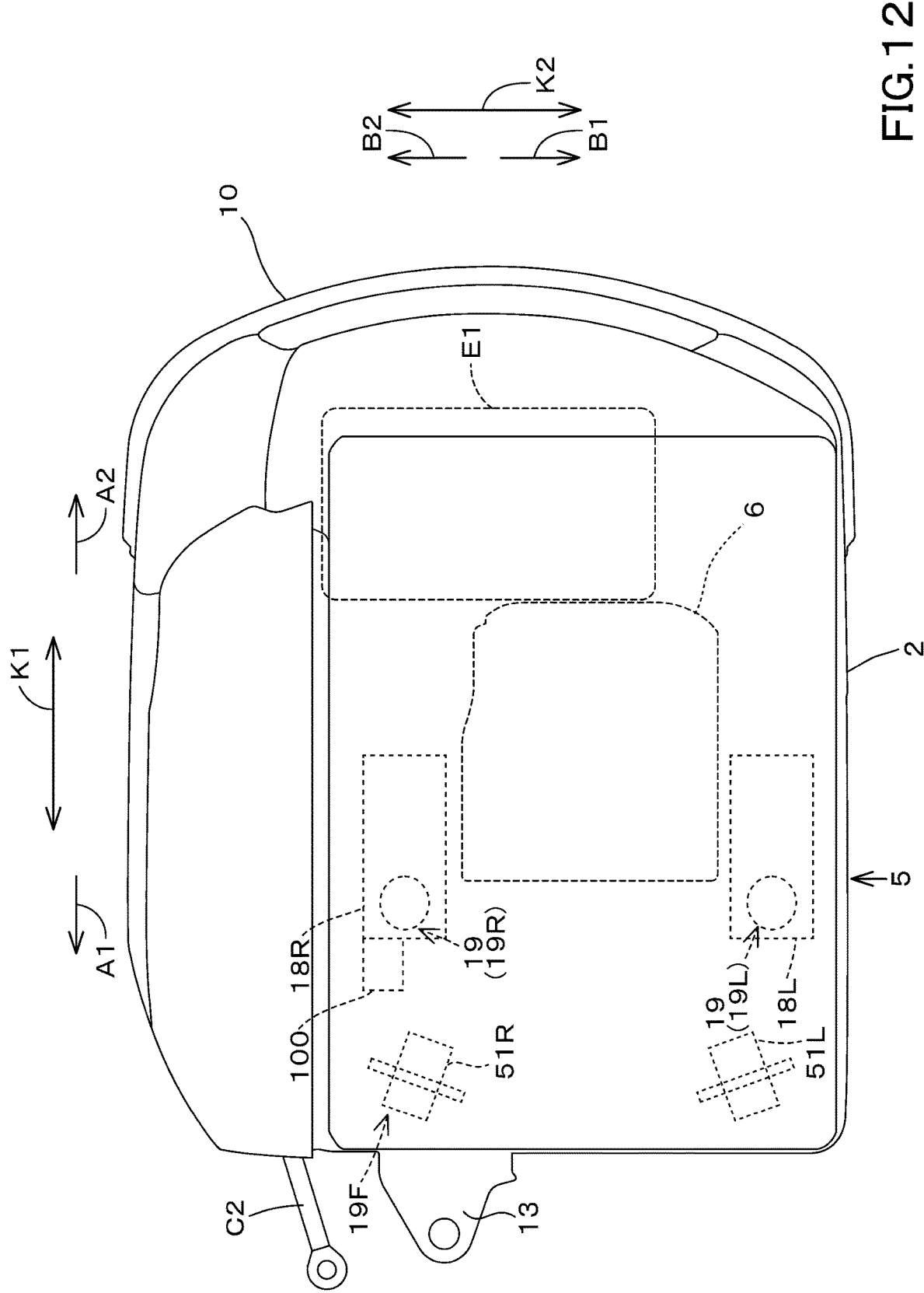
FIG. 12 is a schematic plan view illustrating a part of the working machine according to the embodiments.

FIG. 11 is a schematic side view showing an overall configuration of the working machine 1 according to a first embodiment of the present invention. FIG. 12 is a schematic plan view of the working machine 1. In the present embodiment, a backhoe which is a swiveling working machine is exemplified as the working machine 1.

First, the overall configuration of the working machine 1 will be described.

As shown in FIG. 11 and FIG. 12, the working machine 1 includes a machine body (a turn base) 2, a traveling device 3, and a working device 4. A cabin 5 is mounted on the machine body 2. An operator seat 6 is arranged in an inner space of the cabin 5.

In explanation of the present embodiment, the front side of a driver (an operator) (a direction indicated by an arrowed line A1 in FIG. 11 and FIG. 12) seated on the operator seat 6 of the working machine 1 is referred to as the front, the rear side of the operator (a direction indicated by an arrowed line A2 in FIG. 11 and FIG. 12) is referred to as the rear, the left side of the operator (a front surface side of FIG. 11, a direction indicated by an arrowed line B1 in FIG. 12) is referred to as the left, and the right side of the operator (a back surface side of FIG. 11, a direction indicated by an arrowed line B2 in FIG. 12) is referred to as the right.

In addition, a horizontal direction which is a direction orthogonal to the front-rear direction K1 will be described as a machine width direction K2 (see FIG. 12). The direction extending from the center portion of the machine body 2 to the right portion or the left portion in the width direction will be described as a machine outward direction. In other words, the machine outward direction is the direction separating away from the center of the machine body 2 in the width direction, that is, the machine outward direction is the machine width direction K2. The direction opposite to the machine outward direction will be described as the machine inward direction. In other words, the machine inward direction is the direction approaching the center of the machine body 2 in the width direction, that is, the machine inward direction is the machine width direction K2.

As shown in FIG. 11, the traveling device 3 has a traveling body 3L arranged on the left side and a traveling body 3R arranged on the right side. The traveling body 3L and the traveling body 3R each are crawler-type traveling devices, each of the crawler-type traveling devices includes a driving wheel 11a, a driven wheel 11b, a plurality of rolling wheels 11e, a frame 11c rotatably supporting the driving wheel 11a, the driven wheel 11b, and the rolling wheels 11e, and a belt wound on the driving wheel 11a, the driven wheel 11b, and the rolling wheels 11e. The first traveling motor ML is supported by the frame 11c of the traveling body 3L, and the power of the first traveling motor ML is transmitted to the driving wheel 11a of the traveling body 3L. The second traveling motor MR is supported by the frame 11c of the traveling body 3R, and the power of the second traveling motor MR is transmitted to the drive wheel 11a of the traveling body 3R.

A dozer device 7 is attached to the front portion of the traveling device 3. The dozer device 7 is configured to be moved upward and downward (to move the blade upward and downward) by stretching and shortening the dozer cylinder.

The machine body 2 is pivotably supported on the traveling device 3 by a swiveling bearing 8 about a vertical axis (an axial extending in the vertical direction). The machine body 2 is turned by a turn motor MT constituted of a hydraulic motor (a hydraulic actuator). The machine body 2 has a swiveling base plate 9 which turns about the vertical axis, and a weight 10. The swiveling base plate 9 is formed of a steel plate or the like, and is connected to the swiveling bearing 8. The weight 10 is arranged at the rear portion of the machine body 2. On the rear portion of the machine body 2, a prime mover E1 is mounted. The prime mover E1 is a diesel engine. The prime mover E1 may be an electric motor, or may be a hybrid type having a diesel engine and an electric motor.

The machine body 2 has a support bracket 13 arranged at a front portion slightly close to the right of the center in the machine width direction K2. A swing bracket 14 is attached to the support bracket 13 so as to be pivotable about the vertical axis. The working device 4 is attached to the swing bracket 14.

As shown in FIG. 11, the working device 4 has a boom 15, an arm 16, and a bucket (a working tool) 17. The base portion of the boom 15 is attached to the swing bracket 14 pivotally about the lateral axis (an axis extending in the machine width direction). In this manner, the boom 15 is freely swung upward and downward. The arm 16 is attached to the tip end side of the boom 15 pivotally about the lateral axis. In this manner, the arm 16 is configured to be swung forward and backward, and swung upward and downward. The bucket 17 is provided on the tip end side of the arm 16 so as to be able to perform a shoveling operation and a dumping operation. Other working tools (auxiliary attachments) that can be driven by a hydraulic actuator can be attached to the working machine 1 instead of or in addition to the bucket 17. As the other working tools (the auxiliary attachments), a hydraulic breaker, a hydraulic crusher, an angle broom, an earth auger, a pallet fork, a sweeper, a mower, a snow blower, and the like are exemplified.

The swing bracket 14 is swingable by the stretching and the shortening of a swing cylinder C2 arranged in the machine body 2. The boom 15 is swingable by the stretching and the shortening of the boom cylinder C3. The arm 16 is swingable by the stretching and the shortening of the arm cylinder C4. The bucket 17 can perform the shoveling operation and the dumping operation by the stretching and the shortening of a bucket cylinder (a working tool cylinder) C5. Each of the dozer cylinder, the swing cylinder C2, the boom cylinder C3, the arm cylinder C4, and the bucket cylinder C5 is constituted of a hydraulic cylinder (a hydraulic actuators).

As shown in FIG. 12, on the left side (one side) of the operator seat 6 arranged in the cabin 5, an operation board 18L provided on the vehicle body 2 is arranged. In addition, also on the right side (the other side) of the operator seat 6, an operation board 18R provided on the vehicle body 2 is arranged. Each of the operation board 18L and the operation board 18R is provided with a working operation device 19. The working operation device 19 includes a working operation device (a first working operation device) 19L attached to the operation board 18L, and includes a working operation device (a second working operation device) 19R attached to the operation board 18R.

Figure 2:
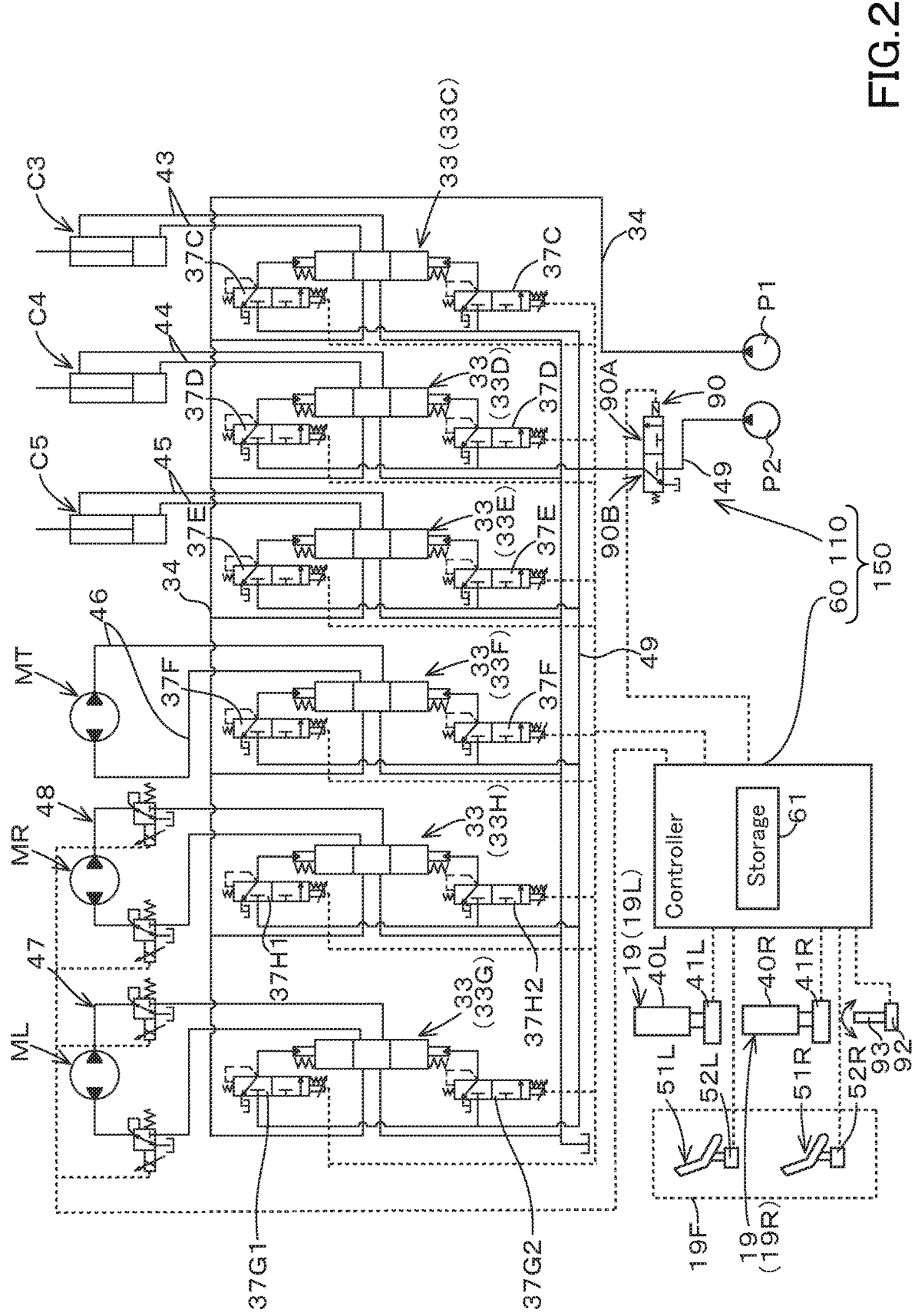
FIG. 2 is a schematic view illustrating a hydraulic system (a hydraulic circuit) for the working machine according to the first embodiment.

FIG. 2 schematically shows a hydraulic circuit (a hydraulic system) for operating a hydraulic actuator of the working machine.

As shown in FIG. 2, the hydraulic system for the working machine 1 is a system for operating the working hydraulic actuators such as the boom cylinder C3, the arm cylinder C4, the bucket cylinder C5, and the turn motor MT, and operating the traveling hydraulic actuators such as the first traveling motor ML, and the second traveling motor MR. In addition, in FIG. 1, the circuit which controls the dozer cylinder and the swing cylinder is omitted for convenience of the explanation. In the hydraulic system of FIG. 2, for convenience of the explanation, a circuit for controlling the dozer cylinder and the swing cylinder C2 is omitted.

The hydraulic system for the working machine 1 includes a first hydraulic pump P1, a second hydraulic pump P2, and a plurality of control valves 33. The first hydraulic pump P1 is a pump that supplies the operation fluid to the working hydraulic actuator and the traveling hydraulic actuator. The first hydraulic pump P1 is, for example, a constant displacement pump (a fixed displacement pump) or a variable displacement pump. In addition, the second hydraulic pump P2 is a pump that supplies the operation fluid for signals, for control, or the like, that is, a pilot fluid. The plurality of control valves 33 are valves that control the working hydraulic actuators and the traveling hydraulic actuators. The first hydraulic pump P1 is connected to the plurality of control valves 33 by a fluid tube 34.

The plurality of control valves 33 include a boom control valve 33C that controls the boom cylinder C3, an arm control valve 33D that controls the arm cylinder C4, a bucket control valve 33E that controls the bucket cylinder C5, and a turn control valve 33F that controls the turn motor MT, a first travel control valve 33G that controls the first travel motor ML, and a second travel control valve 33H that controls the second travel motor MR.

The boom control valve 33C is connected to the boom cylinder C3 by the fluid tube 43. The arm control valve 33D is connected to the arm cylinder C4 by the fluid tube 44. The bucket control valve 33E is connected to the bucket cylinder C5 by an fluid tube 45. The turn control valve 33F is connected to the turn motor MT by an fluid tube 46. The first travel control valve 33G is connected to the first travel motor ML by an fluid tube (a first fluid tube) 47. The second travel control valve 33H is connected to the second travel motor MR by an fluid tube (a second fluid tube) 48.

A boom solenoid valve 37C is connected to a pressure receiving portion of the boom control valve 33C. An arm solenoid valve 37D is connected to a pressure receiving portion of the arm control valve 33D. A bucket solenoid valve 37E is connected to a pressure receiving portion of the bucket control valve 33E. A turn solenoid valve 37F is connected to a pressure receiving portion of the turn control valve 33F. A forward-traveling solenoid valve 37G1 and a backward-traveling solenoid valve 37G2 are connected to the pressure receiving portion of the first travel control valve 33G A forward-traveling solenoid valve 37H1 and a backward-traveling solenoid valve 37H2 are connected to the pressure receiving portion of the second travel control valve 33H.

That is, the solenoid valves 37 (37C, 37D, 37E, 37F, 37G1, 37G2, 37H1, and 37H2) is respectively connected to the plurality of control valves 33. A second hydraulic pump P2 is connected to each of the solenoid valves 37 by an fluid tube 49, and a pilot pressure that is applied to the pressure receiving portion of the control valve 33 is changed is accordance with the opening aperture of the solenoid valve 37, the control valve 33 corresponding to the solenoid valve 37.

Each of the boom control valve 33C, the arm control valve 33D, the bucket control valve 33E, the turn control valve 33F, the first travel control valve 33G, and the second travel control valve 33H is, for example, a switching valve of direct-acting spool type (a direct-acting spool switching valve). Each of the plurality of control valves 33 (33C, 33D, 33E, 33F, 33G; and 33H) switches a direction of the operation fluid supplied to the control valve 33 with use of the pilot fluid applied to the pressure receiving portion through the plurality of solenoid valves 37 corresponding to the control valve 33, and controls the flow rate of the operation fluid to be supplied to the working hydraulic actuators (the boom cylinder C3, the arm cylinder C4, the bucket cylinder C5, and the turn motor MT) or the traveling hydraulic actuators (the first traveling motor ML and the second traveling motor MR).

The working hydraulic actuator is operated by a working operation device 19 (a working operation device 19L and a working operation device 19R) gripped by the operator in the operation. The operation control device 19L includes an operation member 40L swingably supported by the operation board 18L and a first operation detection portion 41L configured to detect the swinging amount of the operation member 40L. The operation member 40L is a lever pivotable forward, backward, rightward, and leftward from the neutral position with respect to the operation board 18L. The first operation detection portion 41L is a potentiometer configured to detect the swinging amount of movement (an operation amount) of the operation member 40L from the neutral position.

When the operator or the like operates the operation member 40L, the operation amount and the operation direction of the operation member 40L are detected by the first operation detection portion 41L, and the detected operation amount and the detected operation direction are inputted to the control device 60 constituted of a CPU or the like. The control device 60 magnetizes the solenoid of the turn solenoid valve 37F connected to the pressure receiving portion of the turn control valve 33F in accordance with the operation amount and the operation direction of the operation member 40L, and controls the opening aperture of the turn solenoid valve 37F. As the result, a pilot pressure is applied to the pressure receiving portion of the turn control valve 33F, the position of the turn control valve 33F is switched, and thereby the rotation direction of the turn motor MT is switched in accordance with the position.

When the operator or the like operates the operation member 40L, the operation amount and the operation direction of the operation member 40L are detected by the first operation detection portion 41L, and the control device 60 magnetizes the solenoid of the arm solenoid valve 37D connected to the pressure receiving portion of the arm control valve 33D in accordance with the operation amount and the operation direction of the operation member 40L, and controls the opening aperture of the arm solenoid valve 37D. As the result, a pilot pressure is applied to the pressure receiving portion of the arm control valve 33D, the position of the arm control valve 33D is switched, and thereby the arm cylinder C4 is stretched and shortened in accordance with the position.

The operation control device 19R has an operation member 40R swingably supported by the operation board 18R, and a second operation detection portion 41R that detects the swinging amount of the operation member 40R. The operation member 40R is a lever that can be pivoted forward, backward, rightward, and leftward from the neutral position with respect to the operation board 18R. The second operation detection portion 41R is a potentiometer that detects the swing amount (the operation amount) from the neutral position of the operation member 40R.

When the operator or the like operates the operation member 40R, the operation amount and operation direction of the operation member 40R are detected by the second operation detection portion 41R, and then the detected operation amount and the detected operation direction are inputted to the control device 60. The control device 60 magnetizes the solenoid of the boom solenoid valve 37C in accordance with the operation amount and the operation direction of the operation member 40R, the boom solenoid valve 37C being connected to the pressure receiving portion of the boom control valve 33C, thereby controlling the opening aperture of the boom solenoid valve 37C. As the result, the pilot pressure is applied to the pressure receiving portion of the boom control valve 33C, the position of the boom control valve 33C is switched, and thereby the boom cylinder C3 is stretched and shortened in accordance with the position.

In addition, when the operator or the like operates the operation member 40R, the operation amount and operation direction of the operation member 40R are detected by the second operation detection portion 41R, and then the control device 60 magnetizes the solenoid of the bucket solenoid valve 37E in accordance with the operation amount and the operation direction of the operation member 40R, the bucket solenoid valve 37E being connected to the pressure receiving portion of the bucket control valve 33E, thereby controlling the opening aperture of the bucket solenoid valve 37E. As the result, the pilot pressure is applied to the pressure receiving portion of the bucket control valve 33E, the position of the bucket control valve 33E is switched, and thereby the bucket cylinder C5 is stretched and shortened in accordance with the position.

As described above, by operating the operation device 19L and the operation device 19R, the machine body 2, the boom 15, the arm 16, and the bucket (the working tool) 17 can be operated.

The operation device 19 includes an operation device 19F other than the operation device 19L and the operation device 19R. The operation device 19F is a device for operating the traveling device 3A, that is, the traveling hydraulic actuators (the first travel motor ML and the second travel motor MR). The operation device 19F is a device configured to change the opening aperture of the travel control valve (the first travel control valve 33G and the second travel control valve 33R) in accordance with the operation amount to the operation device 19F, thereby increasing and decreasing the flow rate (the supply amount) of the operation fluid to be supplied to the first traveling motor ML and the second traveling motor MR.

In particular, the operation device 19F includes a first traveling pedal (a first traveling operation portion) 51L, a first travel detection portion 52L, a second traveling pedal (a second traveling operation portion) 51R, and a second travel detection portion 52R.

The first traveling pedal 51L is a traveling pedal arranged in front of and to the left of the operator seat 6 and configured to increase or decrease the flow rate of the operation fluid supplied by the first travel motor ML. The first traveling pedal 51L is supported to be pivoted forward and backward by a horizontal shaft on a step or the like arranged at a lower portion of the operator seat 6.

The first travel detection portion 52L is a potentiometer that detects a swinging amount (an operation amount) from a neutral position of the first traveling pedal 51L. That is, when the first traveling pedal 51L swings forward, the first travel detection portion 52L detects a forward operation amount (referred to as a forward-traveling operation amount). In addition, when the first traveling pedal 51L is swung backward, the first travel detection portion 52L detects a backward operation amount (referred to as a backward-traveling operation amount).

The first travel detection portion 52L is connected to the control device 60. The first operation amount (the forward operation amount and the backward operation amount) of the first traveling pedal 51L detected by the first travel detection portion 52L is inputted to the control device 60.

The control device 60 outputs a control signal to the forward-traveling solenoid valve 37G1 or the backward-traveling solenoid valve 37G2 in accordance with the magnitude of the first operation amount (the forward operation amount and the backward operation amount), and thereby sets the opening aperture of the forward-traveling solenoid valve 37G1 or the backward-traveling solenoid valve 37G2. Thus, when the operator for example presses the first traveling pedal 51L and the first operation amount which is the pressing amount is detected by the first traveling detection portion 52L, the control device 60 sets the opening apertures of the forward-traveling solenoid valve 37G1 and the backward-traveling solenoid valve 37G2 in accordance with the pressing amount. Thus, the first travel control valve 33G is opened in accordance with the opening apertures of the forward-traveling solenoid valve 37G1 or the backward-traveling solenoid valve 37G2, and thereby increasing or decreasing the flow rate of operation fluid flowing from the first travel control valve 33G to the fluid tube 47. That is, the flow rate of the operation fluid supplied from the fluid tube 47 to the first travel motor ML of the traveling device 3 is increased or decreased in accordance with the operation amount of the operation device 19F, and thereby the traveling speed in the left-turning of the traveling device 3 (the working machine) can be changed.

The second traveling pedal 51R is a traveling pedal arranged in front of and to the right of the operator seat 6 and configured to increase or decrease the flow rate of the operation fluid supplied by the second travel motor MR. The second traveling pedal 51R is supported to be pivoted forward and backward by a horizontal shaft on a step or the like arranged at a lower portion of the operator seat 6.

The second travel detection portion 52R is a potentiometer that detects a swinging amount (an operation amount) from a neutral position of the second traveling pedal 51R. That is, when the second traveling pedal 51R swings forward, the second travel detection portion 52R detects a forward operation amount. In addition, when the second traveling pedal 51R is swung backward, the second travel detection portion 52R detects a backward operation amount.

The second travel detection portion 52R is connected to the control device 60. The second operation amount (the forward operation amount and the backward operation amount) of the second traveling pedal 51R detected by the second travel detection portion 52R is inputted to the control device 60.

The control device 60 outputs a control signal to the forward-traveling solenoid valve 37H1 or the backward-traveling solenoid valve 37H2 in accordance with the magnitude of the second operation amount (the forward operation amount and the backward operation amount), and thereby sets the opening aperture of the forward-traveling solenoid valve 37H1 or the backward-traveling solenoid valve 37H2. Thus, when the operator for example presses the second traveling pedal 51R and the second operation amount which is the pressing amount is detected by the second traveling detection portion 52R, the control device 60 sets the opening apertures of the forward-traveling solenoid valve 37H1 and the backward-traveling solenoid valve 37H2 in accordance with the pressing amount. Thus, the second travel control valve 33H is opened in accordance with the opening apertures of the forward-traveling solenoid valve 37H1 or the backward-traveling solenoid valve 37H2, and thereby increasing or decreasing the flow rate (the second supply amount) of operation fluid flowing from the second travel control valve 33H to the fluid tube 48. That is, the flow rate of the operation fluid supplied from the fluid tube 48 to the second traveling motor MR of the traveling device 3 is increased or decreased in accordance with the operation amount of the traveling control device 50, and thereby the traveling speed in the right-turning of the traveling device 3 (the working machine) can be changed.

In addition, when the first travel pedal 51L and the second travel pedal 51R are simultaneously operated to the forward side or the reverse side, the control portion 60 sets the opening apertures of the travel solenoid valves (forward-traveling solenoid valve 37G1, 37H1 and backward-traveling solenoid valve 37G2, 37H2) in accordance with the first operation amount and the second operation amount. For example, when the first travel pedal 51L and the second travel pedal 51R are stepped to the front side, the control portion 60 sets the opening apertures of the forward-traveling solenoid valves 37G1 and 37H1 in accordance with the stepping amount of the pedals. As the result, the flow rate of the operation fluid supplied to the first traveling motor ML and the second traveling motor MR can be increased or decreased, and thus the traveling speed of the traveling device 3 (working machine) can be changed in forward traveling.

On the other hand, when the first travel pedal 51L and the second travel pedal 51R are depressed rearward, the control portion 60 sets the opening apertures of the backward-traveling solenoid valves 37G2 and 37H2 in accordance with the depressing amount of the pedals. As the result, the flow rate of the operation fluid supplied to the first traveling motor ML and the second traveling motor MR increases or decreases, and thus the traveling speed of the traveling device 3 (working machine) can be changed the backward traveling.

As shown in FIG. 2, the working machine 1 is provided with an operation control device (control device) 150 that controls steering and the like. The operation control device 150 is a device to switch the state of the working machine 1 between an operation allowable state in which the normal steering operation of the working machine 1 by the operation device 19 is allowed and an operation restricting state in which the steering operation of the working machine 1 by the operation device 19 is restricted compared to the operation allowable state. In the present embodiment, the steering operation of the work implement 1 by the working operation device 19 (19L, 19R, 19F) cannot be performed in the operation restricting state. However, not limited to this, only a part of the steering operations that can be performed by the working operation device 19 may be restricted in the operation restricting state.

The operation control device 150 includes a control portion 60 and an operation switching device 110. The operation switching device 110 is a device capable of switching between the operation allowable state and the operation restricting state in accordance with a command (control) of the control portion 60, or manually switching between the operation allowable state and the operation restricting state. The operation switching device 110 includes an unload valve (operation valve) 90, an operation lock switch (lock operation portion) 92, and an operation lock lever (lock operation portion) 93.

The unload valve 90 is configured to be switched between a supply state that enables the supply of operation fluid to the working hydraulic actuator and the traveling hydraulic actuator and a supply stopping state that stops the supply of operation fluid to the working hydraulic actuator and the traveling hydraulic actuator. In particular, the unload valve 90 is a two-position switching valve that can be switched between a first position 90A for setting the supply state and a second position 90B for setting the supply stopping state, and is connected to the pilot fluid tube 49 for supplying the pilot fluid. The unload valve 90 is biased to the second position 90B by a spring or the like. The unload valve 90 is switchable between the first position 90A and the second position 90B by the operation of the operation lock lever 93. For convenience of description, the first position 90A is referred to as a loading position, and the second position 90B is referred to as an unload position.

The operation lock lever 93 is supported on the side of the operator seat 6 swingably between in a lowered state (lowered position) and in an lifted state (lifted position). The operation lock switch 92 is a switch for manually switching between the operation allowable state and the operation restricting state, and is arranged, for example, on an lower portion of the operation lock lever 93. In this case, the operation lock switch 92 is a device for detecting the lowered state (lowered position) and the lifted state (lifted position) of the operation lock lever 93, and the lowered position and the raised position are inputted to the control portion 60. When the lowered position is inputted, the control portion 60 magnetizes the solenoid of the unload valve 90 to switch the unload valve 90 to the load position 90A. When the lifted position is inputted, the control portion 60 demagnetizes the solenoid of the unload valve 90 to switch the unload valve 90 to the unload position 90B.

Thus, when the unload valve 90 is in the unload position, the operation fluid (the pilot fluid) cannot be supplied to the solenoid valves (boom solenoid valve 37C, arm solenoid valve 37D, bucket solenoid valve 37E, turn solenoid valve 37F, forward-traveling solenoid valve 37G1, backward-traveling solenoid valve 37G2, forward-traveling solenoid valve 37H1, backward-traveling solenoid valve 37H2), and thus the operation by the operation devices 19 (19L, 19R, and 19F) cannot be performed (under the operation restricting state). On the other hand, when the unload valve 90 is in the load position, the operation fluid (the pilot fluid) can be supplied to the solenoid valves (boom solenoid valve 37C, arm solenoid valve 37D, bucket solenoid valve 37E, turn solenoid valve 37F, forward-traveling solenoid valve 37G1, backward-traveling solenoid valve 37G2, forward-traveling solenoid valve 37H1, backward-traveling solenoid valve 37H2), and thus the operation by the operation devices 19 (19F, 19L, 19R, and 19F) can be performed (under the operation restricting state). That is, the operation allowable state is established.

FIG. 1 shows a schematic view of a control block of the working machine. As shown in FIG. 1, the working machine 1 includes the control portion 60, the display device 100, and the imaging device 120. The control portion 60, the display device 100, and the imaging device 120 can communicate with each other through an in-vehicle communication network such as CAN (Controller Area Network) or FlexRay.

The display device 100 can perform various displays on the working machine 1 and can make various settings on the working machine 1. The display device 100 is disposed at a position (for example, in front of, in diagonally front of, or on the side of the operator seat) visible by an operator seated on the operator seat in the room of the cabin 5. The imaging device 120 is a camera or the like arranged at the front portion, rear portion, side portion, or upper portion of the working machine 1, and can capture the periphery of the working device 4, a view behind the working machine 1, and the like. For example, the imaging device 120 is arranged at the front portion of the cabin 5, and images around the boom 15, the arm 16, and the bucket (working tool) 17. In addition, the imaging device 120 is arranged at the rear portion of the cabin 5 or at the rear bonnet, and images a view behind the rear bonnet and the periphery of the traveling device 3. Alternatively, the imaging device 120 may be arranged on the side of the working machine 1 to image the side of the machine.

The control portion 60 performs various controls such as automatic idle control (AI control), boom height control, arm height control, and the like in addition to the above-described hydraulic control. The AI control, the boom height control, and the arm height control will be described.

In addition to the operation amount of the operation device 19, the governor angle (the governor position) from the governor sensor, the operation amount (operation angle) of the accelerator lever, the on-signal/off-signal of the idle switch (AI-SW), and signals such as the engine revolving speed from the engine revolving sensor, the arm angle, and the boom angle, are inputted to the control portion 60.

In the AI control, the engine revolving speed is increased or decreased in accordance with the operation amount of the accelerator lever when the control device 19 is operated, and the engine revolving speed is fixed in the idling state when the control device 19 is not operated.

In the boom height control, the lifting operation of the boom 15 is stopped regardless of the operation of the control device 19 when the height of the boom 15 reaches the upper limit value of the preset boom height. In the boom height control, the boom angle is input to the control portion 60 when the boom 15 is raised by the control device 19. Then, when the boom angle inputted to the control portion 60 reaches the upper limit value, the control portion 60 demagnetizes the solenoid of the boom solenoid valve 37C to stop the boom raising operation.

The arm angle control stops the scraping operation of the arm 16 regardless of the operation of the operation device 19 when an angle of the arm (arm angle) reaches the preset upper limit value or lower limit value of the arm angle. In particular, in the arm angle control, the arm angle is inputted to the control portion 60 when the control device 19 performs the scraping operation of the arm 16. Then, by demagnetizing the solenoid of the arm solenoid valve 37D inputted to the control portion 60, the scraping operation of the arm 16 is stopped.

As shown in FIG. 1, the display device 100 has a display portion 101 that performs display. The display portion 101 includes a variable display portion 101a and a fixed display portion 101b. The variable display portion 101a is a portion whose display content is variable, and is configured of a panel such as liquid crystal. The fixed display portion 101b is a portion where the display content is fixed, and is configured of an LED or the like. In the fixed display portion 101b, the presence or absence of a warning or the like of the working machine 1 is displayed by turning on or off the LED.

Figure 3:
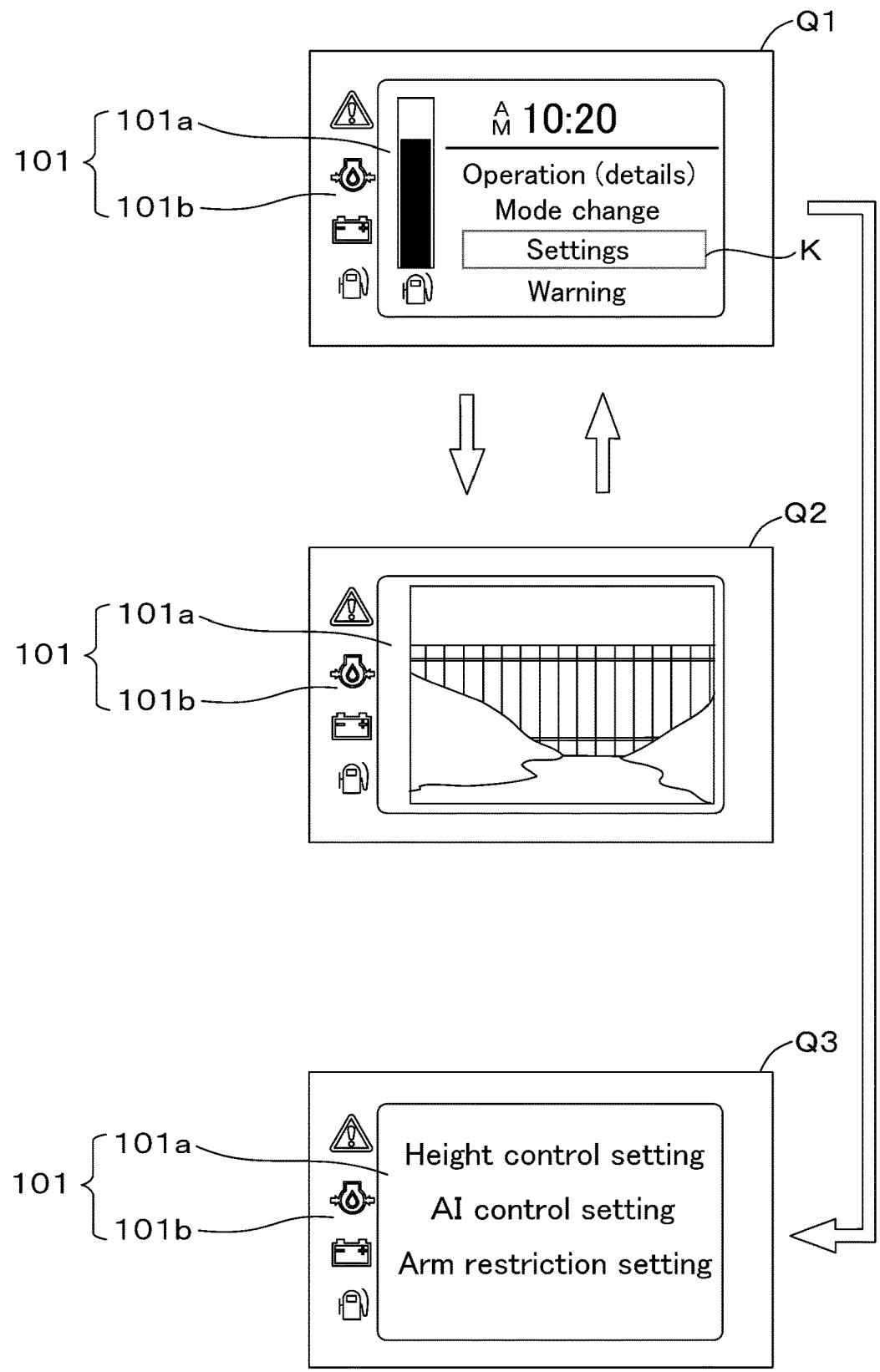
FIG. 3 is a view illustrating one example of a display portion for displaying a menu screen, a drive screen, and a setting screen according to the first embodiment.

As shown in FIG. 3, the variable display portion 101a can display, for example, a menu screen Q1, an driving screen Q2, a setting screen Q3, and the like. The menu screen Q1 is a screen on which basic information is displayed, and displays, for example, items such as operation status (details), mode change, various settings, warnings, and the like, and displays fuel remaining amount, time (clock time), and the like as the information on the working machine. The driving screen Q2 is a screen for displaying an image (a peripheral image) or the like of the imaging device 120 provided in the working machine 1. The setting screen Q3 is a screen (input screen) for displaying information necessary for performing various settings (referred to as machine settings) of the working machine 1. In the setting screen Q3, for example, information necessary for machine setting such as the height control setting, the AI control setting, the arm restriction setting, and the like is displayed.

As shown in FIG. 1, the display device 100 includes an input operation portion 102 for performing the input operation. The input operation portion 102 includes a first operation tool 111, a second operation tool 112, and a third operation tool 113.

The first operation tool 111 is an operation tool having a rotation operation portion that performs a rotation operation and a pressing operation portion that can perform a pressing operation, and is, for example, a rotary encoder switch. In particular, the first operation tool 111 includes a rotation shaft 111a, a rotation operation portion (picking portion) 111b attached to the rotation shaft 111a, and a pressing operation portion (push switch) 111c provided on the picking portion 111b. In the first operation tool 111, the operator can perform a rotation operation by rotating the knob portion 111b around the rotation axis 111b, and the position by the rotation operation is detected by the built-in encoder. In the first operation tool 111, the operator can perform the pressing operation by pressing the push switch 111c.

The second operation tool 112 is a switch having a pressing operation portion that performs a pressing operation, and is, for example, a momentary switch. The third operation tool 113 is also a switch having a pressing operation portion that performs a pressing operation, and is, for example, a momentary switch. In the second operating tool 112 and the third operating tool 113, the operator can perform the pressing operation by pressing the switch.

The display portion 101 of the display device 100 may have a touch panel that serves as the display and input operation portion 102, that is, a touch operation portion that receives a touch operation on the display portion 101 by the operator. In addition, the input operation portion 102 of the display device 100 may include any one or more of the rotation operation portion that performs a rotation operation, the pressing operation portion that performs a pressing operation, and the touch operation portion. The input operation portion 102 is not limited to the above-mentioned configuration. Further, although the setting screen Q3 is exemplified as the input screen of the display device 100, the setting screen Q3 may be any screen as long as the display device 100 performs some input. For example, the menu screen Q1 may be employed, and both of the menu screen Q1 and the setting screen Q3 may be employed and may be limited thereto.

According to the display device 100 described above, the menu screen Q1, the driving screen Q2, the setting screen Q3, and the like can be displayed, and various input operations can be performed by the input operation portion 102.

The control portion 60 can detect an input operation by the input operation portion 102 described above. That is, the control portion 60 can detect the rotation operation by the first operating tool 111, the pressing operation by the first operating tool 111, the pressing operation by the second operating tool 112, and the pressing operation by the third operating tool 113. In particular, an operation signal (referred to as a first operation signal) indicating a rotation operation by the first operation tool 111, a pressing operation by the first operation tool 111, a pressing operation by the second operation tool 112, and a pressing operation by the third operation tool 113 is inputted to the control portion 60. Or, an operation signal (second operation signal) indicating that any one of the first operation tool 111, the second operation tool 112, and the third operation tool 113 is operated is inputted through the display device 100 or the like. The control portion 60 detects an input operation by the input operation portion 102 when the first operation signal or the second operation signal is input.

When a predetermined input operation is performed by the input operation portion 102, the control portion 60 executes an operation switching process of setting the operation restricting state by the operation switching device 110. Here, the predetermined input operation is, for example, an inputting operation to state, to the working machine 1 or the like, that the operator performs an input operation on the display device 100 under a situation where the operation on the display device 100 is not performed. In other words, the predetermined input operation is an operation that first states that the operator has the intention to continuously perform the input operation under the condition where the operation is not performed on the display device 100.

In particular, as shown in FIG. 3, when the pressing operation by the pressing operation portion (push switch) 111c is performed as a predetermined input operation while the driving screen Q2 is displayed, and when the pressing operation by the push switch 111c is performed as a predetermined input operation while the menu screen Q1 is displayed, the control portion 60 shifts to the operation switching process. That is, in this embodiment, the control portion 60 sets the operation restricting state when the pressing operation by the push switch 111c is performed as the predetermined input operation.

In the operation switching process, when the working machine 1 is already in the operation restricting state when the push switch 111c is pressed, the control portion 60 continues the output of the control signal to demagnetize the solenoid of the unload valve 90, and thereby the operation restricting state is maintained. On the other hand, when the working machine 1 is in the operation allowable state when the push switch 111c is pressed in the operation switching process, the control portion 60 outputs the control signal to demagnetize the solenoid of the unload valve 90, and thereby the operation allowable state is switched by the operation restricting state.

After the start of the maneuvering switching process, the control portion 60 continuously monitors whether the input operation by the input operation portion 102 is performed, after maintaining the operation restricting state or being switched from the operation allowable state to the operation restricting state.

The return process is performed based on the state before switching (pre-switching state) of the operation switching device 110 before the control portion 60 shifts to the operation switching process (immediately before the start of the operation switching process), that is, the state of the operation switching device 110 before detection of the input operation of the input operation portion 102. In this embodiment, the state before switching is the state of the operation lock lever 93. As shown in FIG. 1, the control portion 60 includes a storage portion 61 constituted of a non-volatile memory or the like, and the storage portion 61 stores (holds) that the working machine 1 is in the operation allowable state or in the operation restricting state.

When the control portion 60 starts the return processing, the control portion 60 refers to the storage portion 61 to judge whether the pre-switching state is the operation allowable state or the operation restricting state. When the pre-switching state is the operation allowable state, the control portion 60 switches, in the return process, the operation switching device 110 from the operation restricting state to the operation allowable state. When the pre-switching state is the operation restricting state, the control portion 60 continues, in the return processing, the output of the control signal for demagnetizing the solenoid of the unload valve 90, and maintains the operation switching device 110 in the operation restricting state.

In the present embodiment, the operation of the push switch 111c is exemplified as the predetermined input operation in the input operation portion 102. However, the predetermined input operation is not limited to this, and as described later, and may be any one of the pressing operation, the rotation operation, and the touch operation.

Figure 4A:
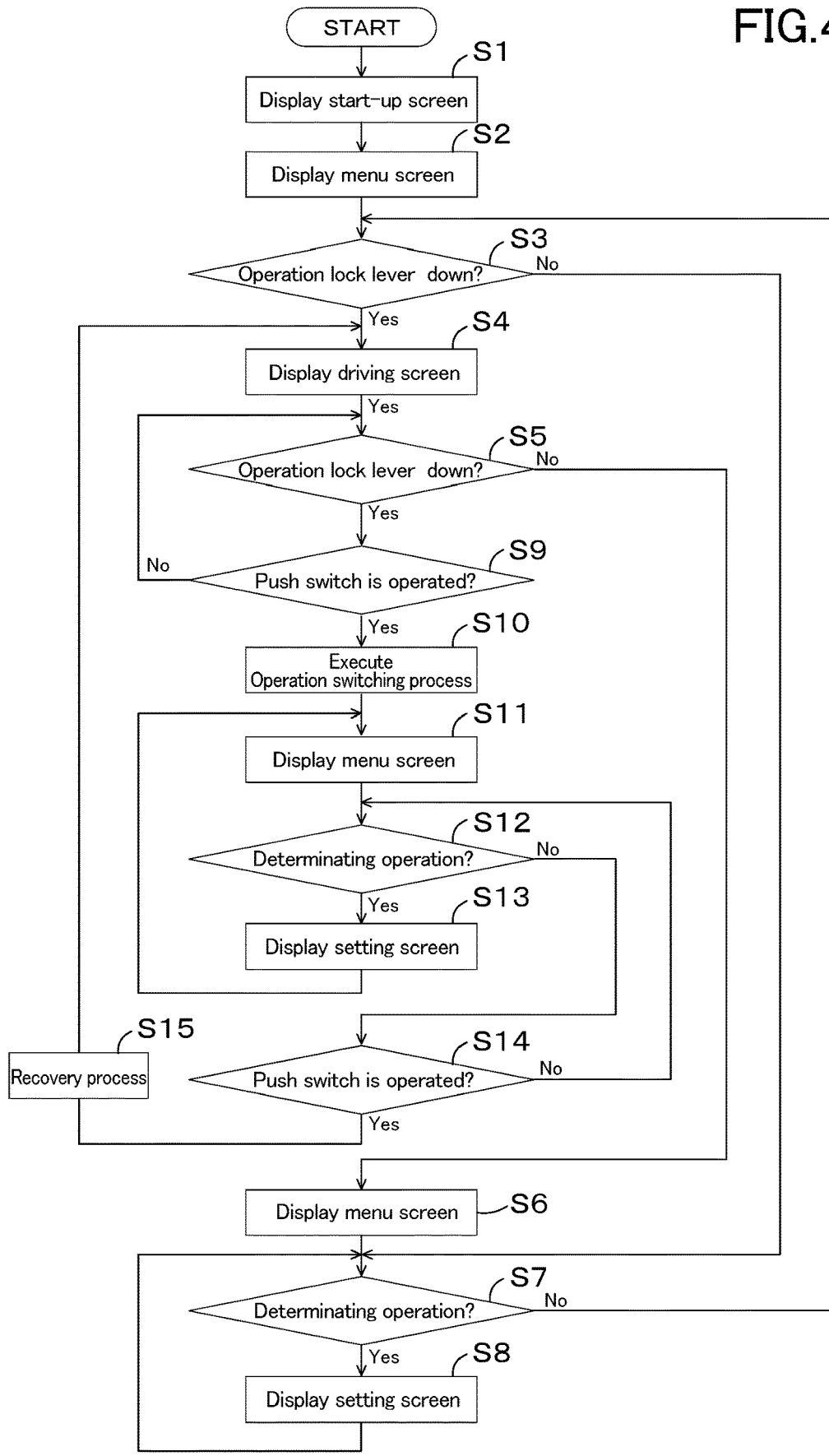
FIG. 4A is a flowchart showing a screen transition between the menu screen, the drive screen, and the setting screen according to the first embodiment.

Next, the input operation in the menu screen Q1, the driving screen Q2, the setting screen Q3, and the input operation portion 102, and the relationship between the operation switching process and the return process by the control portion 60 will be described in detail. FIG. 4A is a flowchart showing the screen transition of the menu screen Q1, the driving screen Q2, and the setting screen Q3.

As shown in FIG. 4A, for example, when the operator turns on the key (engine key) inserted in the key cylinder at the on position, that is, turns on the key, a start-up screen such as a program (for example, a screen starting up with a logo displayed thereon) is displayed on the display portion 101 of the display device 100 (S1). After the start-up of the program or the like, the display device 100 displays the menu screen Q1 on the display portion 101 (S2).

When the operation lock lever 93 is lowered (S3, Yes) under the state where the menu screen Q1 is displayed on the display portion 101 (S2), the display device 100 displays the driving screen Q2 on the display portion 101 (S4). In the state where the driving screen Q2 is displayed on the display portion 101 (S4), the process proceeds to a process of determining whether or not the operation lock lever 93 is lowered (S5: switching judgment process). In the switching judgment process S5 after the display of the driving screen Q2, when the operation lock lever 93 is lifted (the operation lock lever 93 is not lowered) (S5, No), the display device 100 displays the menu screen Q1 on the display portion 101 (S6). In addition, when the engine is started after the display (S2) of the menu screen Q1, the program (software) is once reset and returns to the state after the display (S2) of the menu screen Q1.

The menu screen Q1 can receive an input operation in the input operation portion 102 (the first operation tool 111, the second operation tool 112, and the third operation tool 113). As shown in FIG. 3, for example, on the menu screen Q1, when the operator rotates the knob portion 111b of the first operation tool 111 to perform the rotation operation, the cursor K moves and candidate of the selection item selected by the cursor K (referred to as a candidate selection item) can be changed. When the selection item is determined on the menu screen Q1 under the state where the candidate selection item is selected, for example, when the third operation tool 113 is selected, the selection items of "operation status", "mode change", "various settings", and the like can be determined. That is, the display device 100 can change the plurality of candidate selection items by performing the rotation operation with the first operation tool 111, and can determine the selection items by performing the pressing operation with the first operation tool 111.

When the determination operation of "various settings" is performed (S7, Yes) under the state where the menu screen Q1 is displayed (S6), the display device 100 switches the menu screen Q1 to the setting screen Q3 (S8). In the case where the determination operation of "various settings" is not performed (S7, No), the process returns to the processing of judging whether or not the operation lock lever 93 is in the lowered state (S3).

In addition, when the operation lock lever 93 is lowered (S5, Yes) in the switching judgment process S5 after the display of the driving screen Q2 (S4), the control portion 60 performs judgment as to whether the pressing operation by the push switch 111c which is a predetermined input operation has been performed (S9). That is, in the state where the driving screen Q2 is displayed (S4) and the operation lock lever 93 is lowered (S5, Yes), the control portion 60 judges whether or not the pressing operation by the push switch 111c is performed. (S9).

Here, when the pressing operation of the push switch 111c is not performed (S9, No), the display of the driving screen Q2 is continued. On the other hand, when the operator performs the pressing operation by the push switch 111c (S9, Yes), the control portion 60 executes the operation switching process by the interruption, controls the operation switching device 110, and sets the operation restricting state (S10). Then, when the operation restricting state is set, the display device 100 switches the driving screen Q2 to the menu screen Q1 (S11).

When the determination operation of "various settings" is performed (S12, Yes) in a state where the menu screen Q1 is displayed (S11), the display device 100 switches the menu screen Q1 to the setting screen Q3 (S13). When the determination operation of "various settings" is not performed (S12, No) in the state where the menu screen Q1 is displayed, the process proceeds to determination of whether or not the pressing operation by the push switch 111c is performed (S14). When the pressing operation by the push switch 111c is performed (S14, Yes), the display device 100 switches the menu screen Q1 to the driving screen Q2 (S4) after performing the recovery process (S15) by the control portion 60. When the pressing operation by the push switch 111c is not performed (S14, No), the display of the menu screen Q1 is maintained.

As described above, regardless of the start of the engine, when the driving screen Q2 is displayed and the operation lock lever 93 is lowered (S5, Yes), the operator is in the operation allowable state, and the operator can operate the working machine through steering operation. In such a situation, when the operator performs the pressing operation with the push switch 111c (S9, Yes), the working machine can be changed from the operation allowable state to the operation restricting state (S10). That is, when machine setting is performed on the setting screen Q3, the movement of working machine can be restricted by restricting the steering. When the setting screen S3 is displayed after the pressing operation by the push switch 111c(S9, Yes), the operation restricting state can be maintained until the pressing operation by the push switch 111c (S14, Yes) is performed again. That is, in a state where the second pressing operation by the push switch 111c is not performed (S14, No: second pressing operation) after the first pressing operation by the push switch 111c (S9, Yes: first pressing operation), the display device 100 does not complete the reception of the input to the input operation portion, and the display device 100 completes the input operation at the time when the second pressing operation by the push switch 111c (S14, No: second pressing operation) is performed.

When the control portion 60 completes the acceptance of the input to the input operation portion, the control portion 60 shifts to the return processing, and the control portion 60, in the return state, switches the operation restricting state to the operation allowable state when the state (pre-switching state) before the first pressing operation by the push switch 111c is performed is the operation allowable state. Although not shown in FIG. 4A, when the state before switching is the operation restricting state, the operation restricting state is maintained in the return processing.

Figure 5:
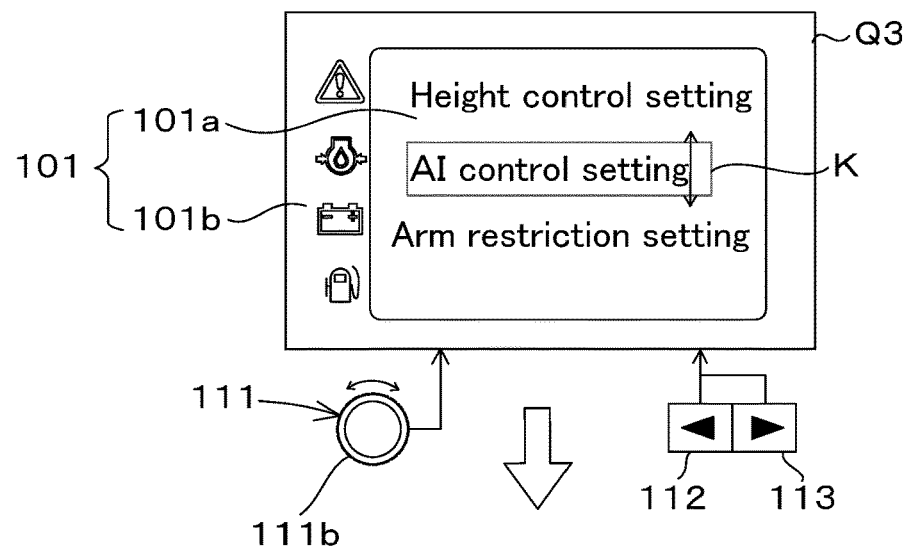
FIG. 5 is an explanation view explaining an AI control setting according to the first embodiment.
Figure 5:
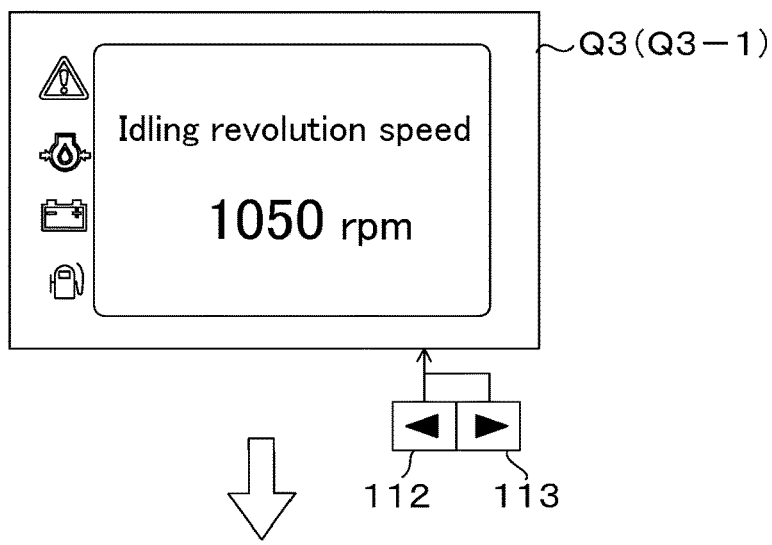
Figure 5:
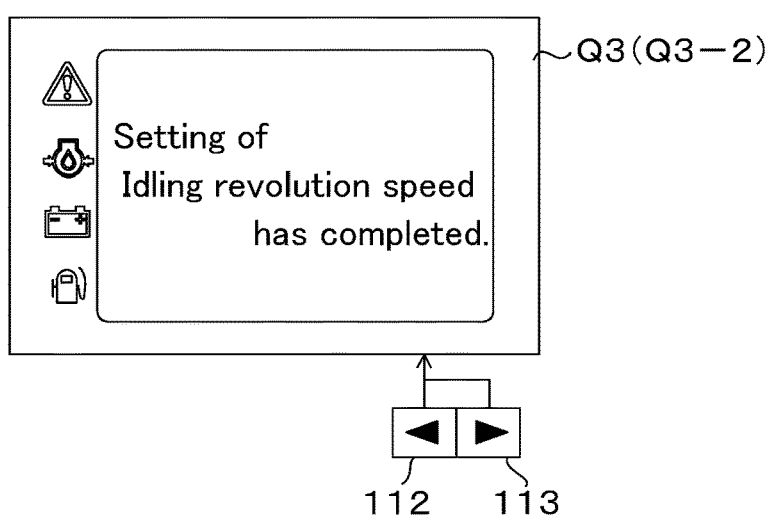

FIG. 5 is a diagram showing the transition of the screen for setting the A1 control among the machine settings on the setting screen Q3. The AI control setting will be described based on FIG. 5.

As shown in FIG. 5, on the setting screen Q3, first, a plurality of selection items for machine setting, for example, "height control setting", "AI control setting", and "arm restriction setting" are displayed. Here, when the operator rotates the knob portion 111b of the first operation tool 111 to perform a rotation operation, the cursor K moves to change the candidate of the selected selection item (referred to as a candidate selection item).

For example, in the setting screen Q3, when the cursor K is placed on the candidate selection item "AI restriction setting" and the operator presses the third operation tool 113, the selection item is determined.

Then, after the selection item of "AI restriction setting" is determined, the setting screen Q3 is switched to the screen Q3-1 for setting the idling speed. In the screen Q3-1, the value of the idling speed displayed on the screen Q3-1 can be changed (increased or decreased) by the rotation operation of the knob 111b. When the third operation tool 113 is pressed after changing the idling speed on screen Q3-1, the value (setting value) of the changed idling speed displayed on screen Q3-1 (setting screen Q3) is updated to be new idling speed. After the change of the idling speed, the setting screen Q3 is switched to the screen Q3-2 indicating that the idling speed has been updated. When the third operation tool 113 is pressed again on the screen Q3-2, the setting of the idling speed in the setting screen Q3 is completed, and the screen returns to at least one previous screen, for example, the setting screen Q3.

By the way, although in the setting screen Q3, the operation is in the operation restricting state, the operation switching device 110 may be temporarily switched from the operation restricting state to the maneuverable state in the setting screen Q3.

Figure 6:
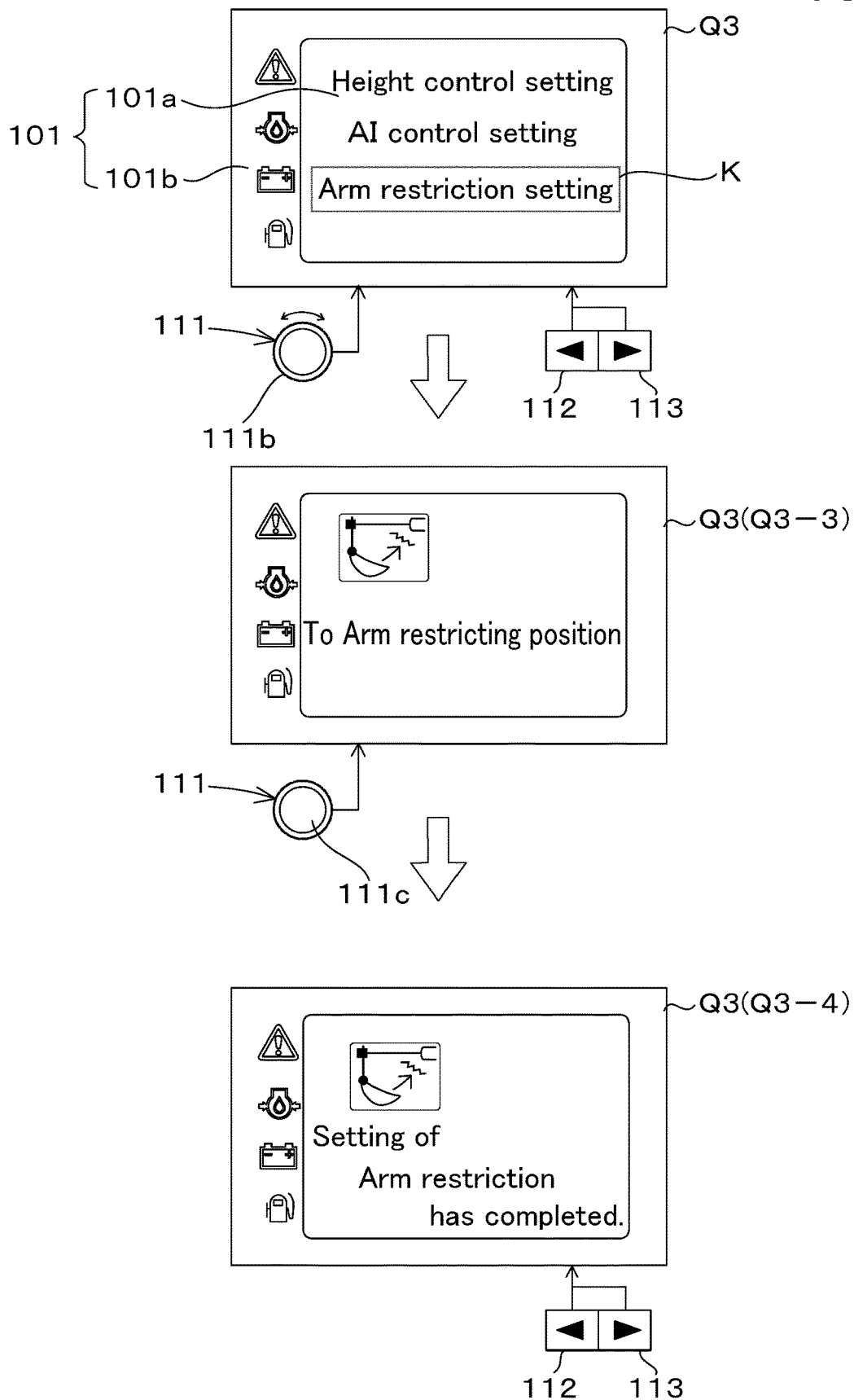
FIG. 6 is an explanation view explaining an arm restriction setting according to the first embodiment.

The case where the steering change device 110 is temporarily switched from the operation restricting state to the operation allowable state will be described based on FIG. 6. FIG. 6 is a diagram showing a screen transition of arm restriction setting.

As shown in FIG. 6, in the setting screen Q3, when the cursor K is placed on the candidate selection item "arm restriction setting" and the operator presses the third operation tool 113, the selection item is determined to be "arm restriction setting". At the time when the operation for moving the cursor K is performed, the control portion 60 shifts to the operation switching process.

Then, after the selection item of "arm limit setting" is determined, a screen Q3-3 for instructing the position of the arm 16 to be the limit position is displayed as the setting screen Q3. When screen Q3-3 is displayed and when operation for raising or lowering arm 16 is performed in operation device 19L (when the operation for raising or lowering arm 16 is input), control portion 60. The operation switching device 110 is temporarily switched from the operation restricting state to the pilotable state.

After the operation switching device 110 is temporarily switched to the operation allowable state, the operator operates the operation device 19L to set the arm 16 to the desired limited position (upper limit position, lower limit position). Then, when the push switch 111c or the like of the first operation tool 111 is pressed in a state where the screen Q3-3 is displayed, the control portion 60 switches the operation switching device 110 from the operation allowable state to the operation restricting state. Return to the maneuver restriction state.

In addition, when the third operation tool 113 is pressed in the state where the screen Q3-3 is displayed, the upper limit value and the lower limit value of the arm angle are updated, and the setting screen Q3 indicates that the arm restriction setting is updated. The display switches to screen Q3-4. When the second operation tool 113 is pressed on the screen Q3-4, the screen (the control portion 60) of the display device 100 returns to the display of the menu screen Q1. In addition, when the first operation tool 111 is pressed in the operation restricting state, the control portion 60 shifts to the return processing and then ends the operation switching processing.

In the present embodiment, the working machine 1 includes an operation device 19 that performs operations of the traveling device 3, the working device 4, the turn motor MT, and the dozer device 7, a control device 150 to control the operation allowable state that allows the operations by the operation device 19 and the operation restricting state that restricts the operation by the operation device 19, and the display device 100 having the display portion 101 and the input operation portion 102. When the input operation is performed by the input operation portion 102 (for example, when the pressing operation by the push switch 111c is performed), the operation allowable state is switched to the operation restricting state. As a result, when the operator performs an input operation by means of the push switch 111c, the control of the working device 4 by the control device 19 can be restricted.

The working machine 1 includes the imaging device 120 that picks up a peripheral image of the working machine 1, and the display device 100 causes the display portion 101 to display the peripheral image picked up by the imaging device 120 when being in the operation allowable state. Thus, when the operator steers the working device 4 using the operation device 19, the operator can steer the working device 4 while viewing the peripheral image of the work implement 1.

When a predetermined input operation is performed by the input operation portion 102, the control device 150 sets the operation restricting state, and displays an input screen on the display portion 101 for performing the setting regarding the working machine 1 using the input operation portion. Thus, when the operator performs setting on the working machine 1 using the input operation portion 102 on the input screen displayed on the display portion 101, the operation of the working machine 1 by the operation device 19 is automatically and surely restricted.

The control device 150 displays, on the display portion 101, the peripheral image imaged by the imaging device 120 when the input operation of the input screen is completed. Thus, after the operation on the input screen is completed, the operator can operate the working device 4 while confirming the peripheral image quickly without focusing the operation to display the peripheral image, so that the operator concentrates on the work.

The control device 150 includes a storage portion for storing whether the operation is in the operation allowable state or the operation restricting state before the predetermined input operation is performed. When the acceptance of the input to the display device 100 is completed after the predetermined input operation is performed, the control device 150 switches the operation restricting state to the operation allowable state when the pre-switching state is the operation allowable state, and maintain the operation restricting state when the pre-switching state is the operation restricting state. Thus, after the display apparatus 100 completes acceptance of the input operation unit 102, the operator can return to the pre-switching state without knowing how the pre-switching state is.

The control device 150 includes a lock operation portion (an operation lock switch 92, an operation lock lever 93) for switching between the operation allowable state and the operation restricting state. Thus, the operator can be easily put into the operation restricting state by the lock operation portion. Note that one or both of the operation lock switch 92 and the operation lock lever 93 may be omitted.

The input operation portion includes any one or more of the press operation portion that receives a press operation by an operator, the rotary operation tool that receives a rotation operation by the operator, and the touch operation portion that receives a touch operation on the display portion 101 by the operator. Thus, the input operation to the working machine 1 can be easily performed.

The input operation portion includes a first operation tool 111 for accepting a rotating operation and a pressing operation by an operator, and a second operation tool 112 and a third operation tool 113 each for receiving a pressing operation by the operator, wherein the predetermined operation is the pressing operation to the first operation tool 111, and the control device 150 changes the candidate selection item among the plurality of selection items displayed on the display portion 101 in accordance with the rotation operation of the first operation tool 111, determines the selection item through the pressing operation of the third operation tool 113, and cancels the selection item determined in accordance with the pressing operation of the second operation tool 112 (for example, an operation to return to the previous display screen). Thus, in the case where the input operation is performed on the working machine 1 (for example, in the case when the operator performs the machine setting of the working machine 1), the operator presses the first operation tool 111 first, and thereby the operation switching state is restricted by the operation switching device 150. In addition, the candidate selection item which is the item of the machine setting can be easily changed by the first operation tool 111 with a rotary encoder. In addition, the candidate selection item can be easily determined by the third operation tool 113 which accepts the pressing operation different from the pressing operation of the first operation tool 111. Moreover, the determined selection item can be easily cancelled (for example, the operation to return to the previous display screen) through the pressing operation of the second operation tool 112 different from the third operation tool 113.

Figure 4B:
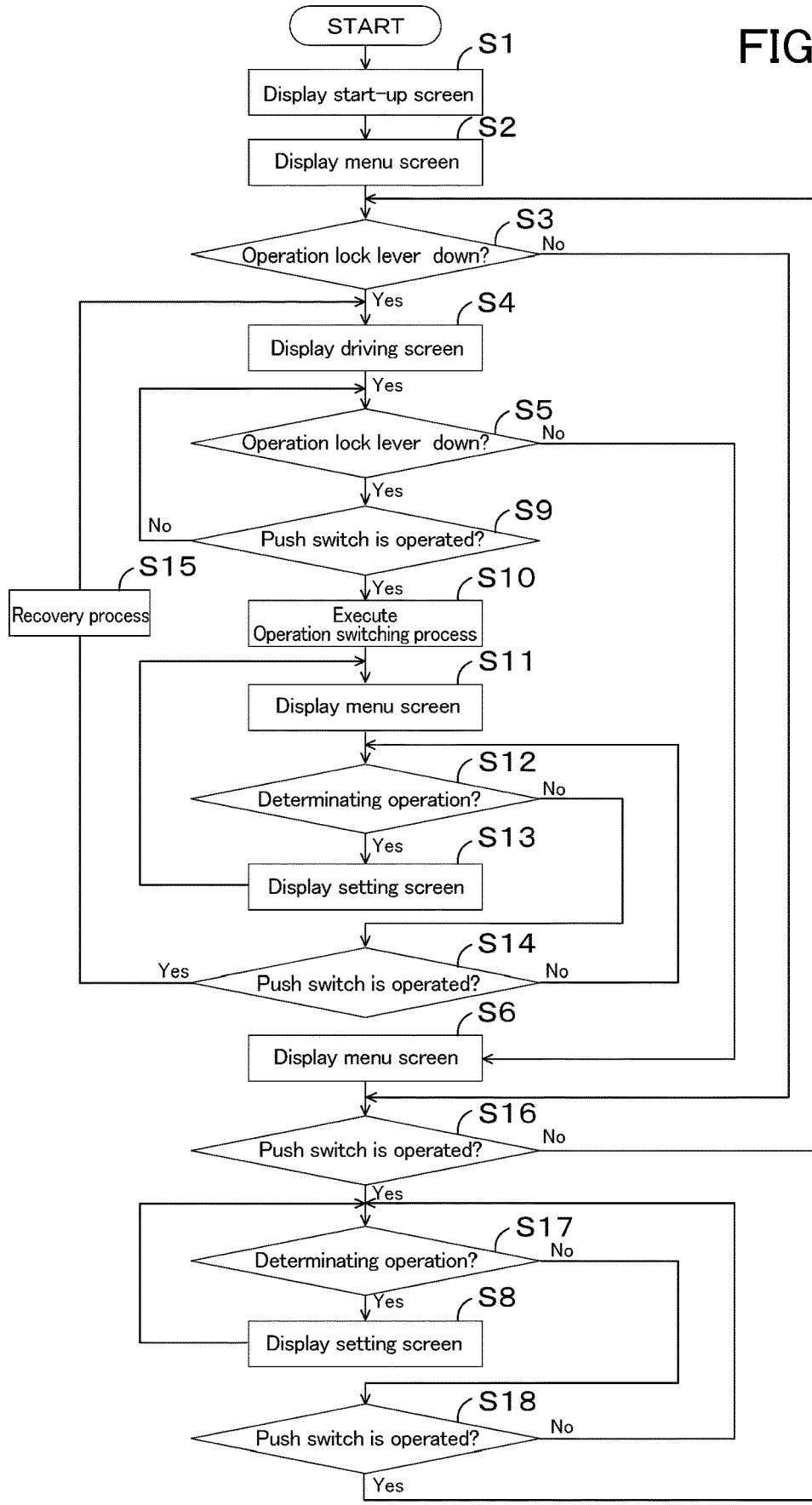
FIG. 4B is a flowchart showing a screen transition between the menu screen, the drive screen, and the setting screen according to the first embodiment.

FIG. 4B shows a modified example of FIG. 4A. In FIG. 4B, step S1 to step S6 and step S8 to step S15 are similar to those in FIG. 4A. As shown in FIG. 4B, the control portion 60 proceeds to judgment as to whether or not the pressing operation by the push switch 111c is performed (step S16) under the state where the menu screen Q1 is displayed (step S6). When the pressing operation by the push switch 111c is performed (step S16, Yes), the process proceeds to judgment as to whether or not the determination operation is performed (step S17), and after the determination operation (step S17, Yes), the setting screen Q3 is displayed. (step S8). That is, in FIG. 4B, at the time of standby of the working in the working machine 1 (moving the operation lock lever 93 upward, step S3, No), and the like, the operator declares the input operation to the display device 100 by pressing the push switch 111c (step S16, Yes), and after the input declaration, operation of the setting screen Q3 and the like is allowed (step S8).

In addition, in the case where the determination operation of "various settings" is not performed in the state where the menu screen Q1 is displayed (step S6) (step S17, No), the process shifts to judgment as to whether or not the pressing operation by the push switch 111c is performed. (step S18). When the pressing operation by the push switch 111c is not performed (step S18, No), the display of the menu screen Q1 is maintained. On the other hand, in the case where the pressing operation by the push switch 111c is performed, (step S18, Yes) the process returns to the process of judgment as to whether or not the operation lock lever 93 is lowered (step S3). That is, in FIG. 4B, at the time of standby of the working in working machine 1 (step S3, No), the operator can complete the input operation on display device 100 through the pressing operation of the push switch 111c (step S18, Yes) after the declaration of the input operation on display device 100 (step S16, Yes).

Second Embodiment

Figure 7:
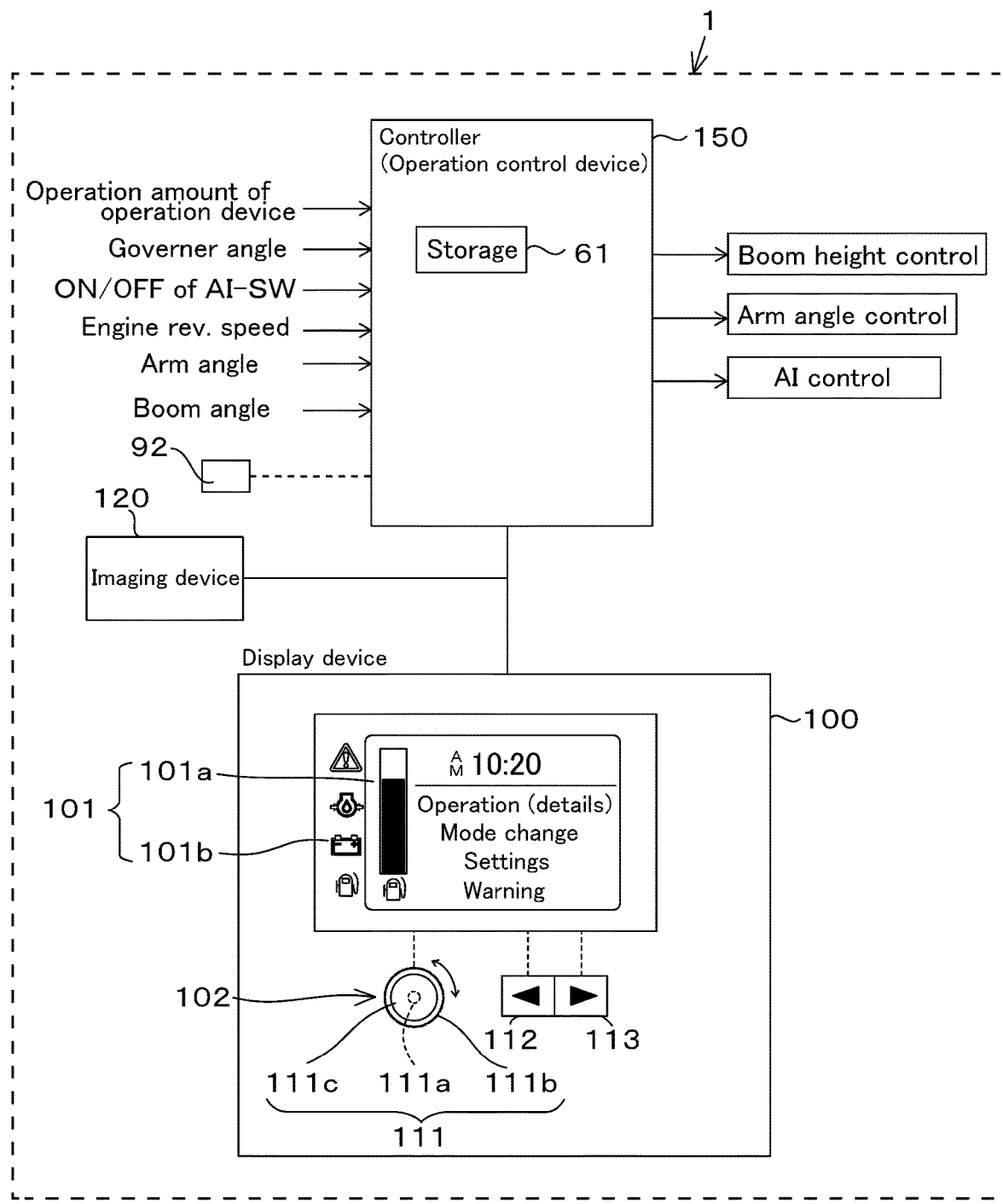
FIG. 7 is a schematic view illustrating a control block of a working machine according to a second embodiment of the present invention.
Figure 8:
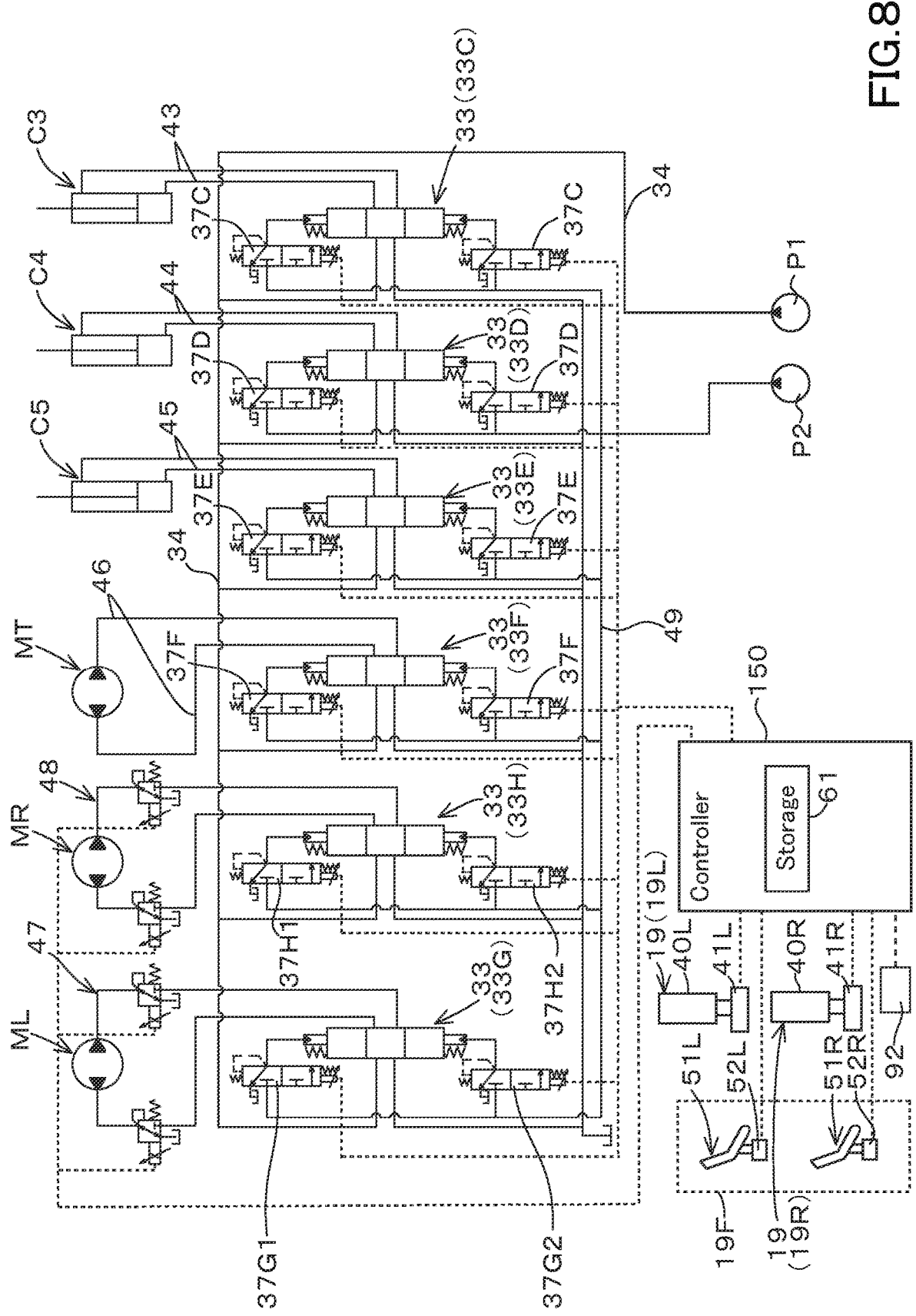
FIG. 8 is a schematic view illustrating a hydraulic system (a hydraulic circuit) for the working machine according to the second embodiment.

FIG. 7 shows a control block of a working machine according to the second embodiment, and FIG. 8 shows a hydraulic system for the working machine according to the second embodiment. In the first embodiment, when a predetermined input operation is performed through the input operation portion 102, the operation-restricting state is mechanically established by switching the operation switching device 110 (the unload valve 90); however, in the second embodiment, the operation-restricting state is electrically established without using the unload valve 90. In the description of the second embodiment, a configuration different from those of the first embodiment will be described.

As shown in FIG. 7 and FIG. 8, the control device 150 is a device constituted of a CPU or the like, and a plurality of solenoid valves 37C, 37D, 37E, 37F, 37G1, 37G2, 37H1, and 37H2 are connected the control device 150. Similar to the control portion 60 described in the first embodiment, the control device 150 can perform various controls such as a hydraulic control, an automatic idle control (an AI control), a boom height control, an arm height control, and the like.

In addition, when a predetermined input operation, that is, a pressing operation of the push switch 111c is performed, the control device 150 executes an operation switching process. Even in the case where the operation device 19L, the operation device 19R and the operation device 19F are operated in the operation switching process and thereby the operation amount of the operation device is inputted, the control device 150 leaves the electromagnetic valve in a demagnetized state, that is, the control device 150 does not accept the operation of the operation device. On the other hand, when the operation device 19L, the operation device 19R, and the operation device 19F are operated and thereby the operation amount of the operation device is inputted, the control device 150 accepts the operation of the operation device under a state the operation switching process is not executed, and then the control 150 control the solenoid valve on the basis of the operation amount of the operation device.

As described above, the control device 150 is constituted of a CPU or the like in the second embodiment; in this manner, the operation allowable state and the operation restricting state can be electrically switched therebetween, and thus the control device 150 can establish the operation restricting state when a predetermined input operation is performed through the input operation portion 102.

In the second embodiment, it is preferable to provide an operation lock switch (a lock operation portion) 92 for manually switching the operation allowable state and the operation restricting state therebetween. In that case, the operation lock switch 92 may be a selector switch that can be operated directly by the operator, or may be a switch that detects the swinging of the operation lock lever 93 as described in the first embodiment.

Figure 9:
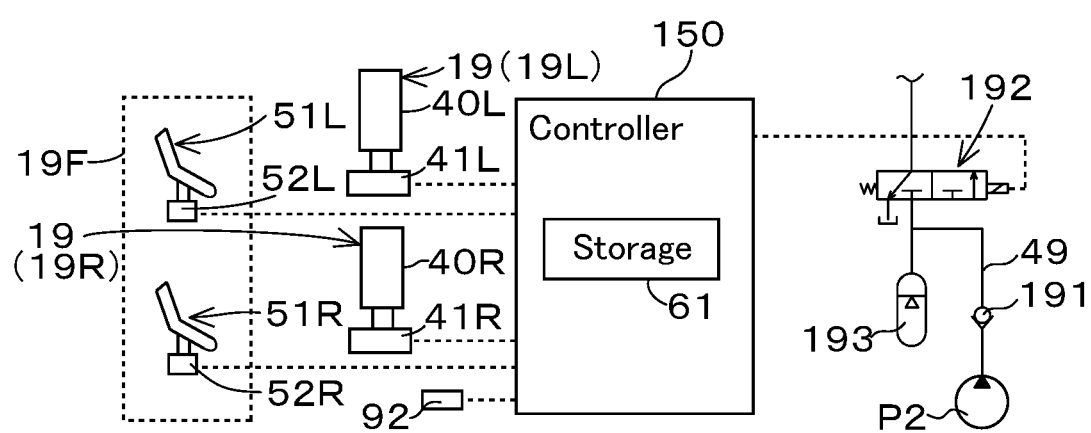
FIG. 9 is a view illustrating a modified example of the hydraulic system for the working machine.

In addition, as shown in FIG. 9, a check valve 191 is provided in the pilot fluid tube 49, a switching valve 192 configured to be switched between two positions is provided on a downstream side of the check valve 191, and an accumulator 193 is connected to the switching valve 192. Then, the switching valve 192 may switch therebetween a connected state in which the accumulator 193 is connected to the pilot fluid tube 49 and a disconnected state in which the accumulator 193 is not connected to the pilot fluid tube 49.

Third Embodiment

Figure 10:
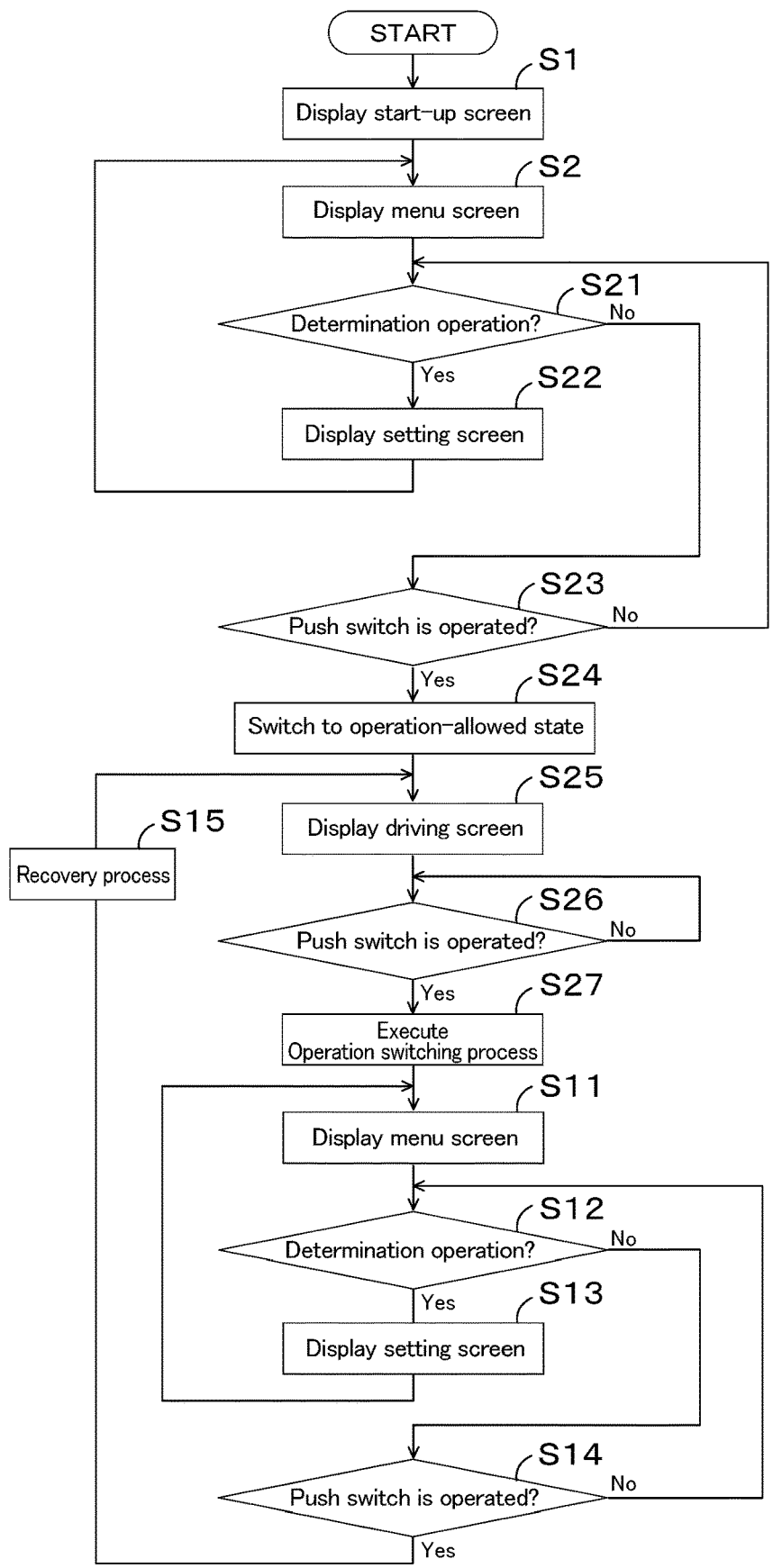
FIG. 10 is a flowchart showing a screen transition between a menu screen, a drive screen, and a setting screen according to a third embodiment of the present invention.

FIG. 10 is a flowchart showing the screen transition of the menu screen, the driving screen, and the setting screen in a third embodiment of the present embodiment. In the first embodiment and the second embodiment, the working machine 1 is provided with the operation lock switch 92 and the operation lock lever 93; however, in the third embodiment, the operation lock switch 92 and the operation lock lever 93 are not employed, and the operation lock switch 92 and the operation lock lever 93 are provided commonly in the push switch 111c. In the third embodiment, a notification portion (for example, a lamp) for indicating whether or not the operation of the working machine is restricted is arranged in the vicinity of the operator seat 6.

As shown in FIG. 10, after the operator turns on the key, the start-up screen is displayed on the display portion 101 of the display device 100 (step S1). Then, the display device 100 displays the menu screen Q1 on the display portion 101 (step S2). When the determination operation is performed (step S21, Yes) under the state where the menu screen Q1 is displayed on the display portion 101 (step S2), the display device 100 displays the setting screen Q3 on the display portion 101 (S22). In addition, when the determination operation to "various settings" (or "settings") is not performed (step S21, No) under the state where the menu screen Q1 is displayed (step S2), the process shifts to the judgment whether or not the pressing operation by the push switch 111c is performed (step S23). In the case where the pressing operation by the push switch 111c is not performed (step S23, No), the display of the menu screen Q1 is maintained. On the other hand, in the case where the pressing operation by the push switch 111c is performed (step S23, Yes), the control portion 60 controls the operation switching device 150 to switch the working machine to the operation allowable state (step S24), and the display device 100 displays the driving screen Q2 (step S25). At this time, the lamp is turned off (OFF) to notify that the working machine can be operated. In addition, when the engine is started after the display (step S2) of the menu screen Q1, the program (the software) is once reset, and returns again to the state after the display (step S2) of the menu screen Q1.

In addition, under the state where the driving screen Q2 is displayed (S25), the control portion 60 judges whether or not the pressing operation by the push switch 111c which is a predetermined input operation has been performed (step S26). Here, in the case where the pressing operation of the push switch 111c is not performed (step S26, No), the display of the driving screen Q2 is maintained. In the case where the pressing operation by the push switch 111c is performed (step S26, Yes), the control portion 60 interrupts the process to execute the operation switching process, and controls the operation switching device 110 to be set into the operation restricting state (step S27). At this time, the lamp is turned on (ON) to notify that the operation of the working machine can be restricted. In FIG. 10, the processes after step S27 are the same as steps S11 to S15 in FIG. 4A. In the return process (step S15), when the working machine is switched from the operation restricting state to the operation allowable state, the lamp is turned off (OFF) to notify that the working machine is ready to be operated.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modified examples within and equivalent to a scope of the claims.

What is claimed is:
1. A working machine comprising:
a machine body;
a working device on the machine body;

an operation device to conduct operations of the working device;
a control device to control the working device between an operation allowable state and an operation restriction state, the operation allowable state allowing the working machine to be operated, the operation restriction state restricting the operations conducted by the operation device in comparison with the operation allowable state;
a display device having: a display portion; and an input operation portion; and
a lock operation lever to manually switch by a swing operation between the operation allowable state and the operation restriction state, the lock operation lever being separate from the input operation portion;
the control device switching from the operation allowable state to the operation restriction state when a predetermined input operation is conducted through the input operation portion, in a case where the lock operation lever has been switched to the operation allowable state; and
a storage portion to store whether the lock operation lever has been switched to the operation allowable state or the operation restriction state when the predetermined input operation is conducted through the input operation portion,
wherein when the display device has received input to the input operation portion after the predetermined input operation is conducted, the control device switches the operation restriction state to the operation allowable state when the lock operation lever has been switched to the operation allowable state, and maintains to the operation restriction state when the lock operation lever has been switched to the operation restriction state.

2. The working machine according to claim 1,
wherein the input operation portion includes:
  a first operation tool to accept a rotating operation and a pressing operation conducted by an operator;
  a second operation tool to accept the pressing operation conducted by the operator; and
  a third operation tool to accept the pressing operation conducted by the operator,
wherein the predetermined input operation is the pressing operation to the first operation tool,
and wherein the control device changes a selection item candidate in accordance with the rotating operation of the first operation tool, the selection item candidate being included in a plurality of selection items displayed on the display portion, determines the selection item in accordance with the pressing operation of the second operation tool, and returns to a state before determination of the selection item in accordance with the pressing operation of the third operation tool.

3. A working machine comprising:
a machine body;
a working device on the machine body;
an operation device to conduct operations of the working device;
a first hydraulic pump to output operation fluid;
a second hydraulic pump to output the pilot fluid;
a solenoid valve to control pressure of the pilot fluid from the second hydraulic pump;
a control valve control flow rate of operation fluid supplied to the working device in accordance with the pressure of the pilot fluid;
an unload valve configured to switch between a load position to supply the pilot fluid to the control valve through the solenoid valve and an unload position to block the pilot fluid to the control valve through the solenoid valve;
a controller to cause the solenoid valve to control the pressure of the pilot fluid in accordance with operation of the operation device, thereby to control the flow rate of the operation fluid supplied to the working device;
a manual lock switch connected to the controller and configured to select a first position to cause the unload valve to be switched to the load position or a second position to cause the unload valve to be switched to the unload position; and
a display device connected to the controller, having a display portion and an input operation portion, wherein
the input operation portion includes
  an input switch configured to switch the unload valve from the load position to the unload position with a first operation thereof, and to switch the unload valve back from the unload position to the load position with a second operation followed by the first operation thereof, and
  an operation tool configured to change settings of the working device,
the controller is configured, at the first position of the manual lock switch,
  to switch the unload valve from the load position to the unload position and to allow the operation tool to change the settings of the working device, through the first operation of the input switch, and
  to prohibit the operation tool to change the settings of the working device and to switch the unload valve back from the unload position to the load position, through the second operation of the input switch, and
the controller is configured, at the second position of the manual lock switch,
  to keep the unload valve at the unload position and to allow the operation tool to change the settings of the working device, through the first operation of the input switch, and
  to prohibit the operation tool to change the settings of the working device and to keep the unload valve at the unload position, through the second operation of the input switch.

4. A working machine comprising:
a machine body;
a working device on the machine body;
an operation device to conduct operations of the working device;
a first hydraulic pump to output operation fluid to a control valve;
a second hydraulic pump to output pilot fluid to a solenoid valve;
a controller to cause the solenoid valve to control the pressure of the pilot fluid in accordance with operation of the operation device, thereby to control the flow rate of the operation fluid supplied to the working device;
a manual lock switch connected to the controller and configured to select a first position to cause the solenoid valve to supply the pilot fluid to the control valve or a second position to cause the solenoid valve not to supply the pilot fluid to the control valve; and
a display device connected to the controller, having a display portion and an input operation portion, wherein
the input operation portion includes an input switch configured to cause the solenoid valve to be disable with a first operation thereof, and to be enable with a second operation followed by the first operation thereof, and an operation tool configured to change settings of the working device, the controller is configured, at the first position of the manual lock switch, to cause the solenoid valve to be disable, and to allow the operation tool to change the settings of the working device, through the first operation of the input switch, and to prohibit the operation tool to change the settings of the working device and to cause the solenoid valve to be enable, through the second operation of the input switch, and the controller is configured, at the second position of the manual lock switch, to allow the operation tool to change the settings of the working device, through the first operation of the input switch, and to prohibit the operation tool to change the settings of the working device and to keep the solenoid valve to be disable, through the second operation of the input switch.

* * * * *